(12) United States Patent
Takahashi et al.

(10) Patent No.: US 11,993,215 B2
(45) Date of Patent: *May 28, 2024

(54) DRIVE DEVICE

(71) Applicant: DENSO CORPORATION, Kariya (JP)

(72) Inventors: Yusuke Takahashi, Kariya (JP); Akito Ito, Kariya (JP); Kotaro Tanaka, Kariya (JP); Keisuke Atsumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 364 days.

This patent is subject to a terminal disclaimer.

(21) Appl. No.: 17/458,986

(22) Filed: Aug. 27, 2021

(65) Prior Publication Data

US 2022/0063522 A1 Mar. 3, 2022

(30) Foreign Application Priority Data

Sep. 2, 2020 (JP) .................................. 2020-147784

(51) Int. Cl.
*B60R 16/023* (2006.01)
*B60L 3/00* (2019.01)
(Continued)

(52) U.S. Cl.
CPC .......... *B60R 16/023* (2013.01); *B60L 3/0038* (2013.01); *B60L 3/0046* (2013.01); *B60L 3/0084* (2013.01); *B60L 15/2054* (2013.01); *B60W 10/08* (2013.01); *B60L 2240/12* (2013.01); *B60L 2240/48* (2013.01)

(58) Field of Classification Search
CPC .... B60R 16/023; B60L 3/0038; B60L 3/0046; B60L 3/0084; B60L 15/2054; B60L 2204/12; B60L 2204/48; B60W 10/08
See application file for complete search history.

(56) References Cited

U.S. PATENT DOCUMENTS

| 4,523,281 A | 6/1985 | Noda et al. |
| 2004/0038659 A1 | 2/2004 | Hirata |

(Continued)

FOREIGN PATENT DOCUMENTS

| JP | 2005-170111 A | 6/2005 |
| JP | 2010-250502 A | 11/2010 |

(Continued)

OTHER PUBLICATIONS

U.S. Appl. No. 17/459,500, filed Aug. 27, 2021, Ito et al.

*Primary Examiner* — Behrang Badii
*Assistant Examiner* — Jay Khandpur
(74) *Attorney, Agent, or Firm* — POSZ LAW GROUP, PLC

(57) ABSTRACT

A drive device includes: a control storage unit of a current value of a control signal indicating a drive state of each of loads; a drive unit of the switches according to the current value; an acquisition unit of a current drive state of each load; a determination storage unit of a transition determination value; and a determination unit that compares a correlated drive state of each load correlated with the current value with the transition determination value, and determines that the current value is abnormal when the correlated drive state and the transition determination value satisfy a predetermined corresponding relationship.

17 Claims, 19 Drawing Sheets

(51) Int. Cl.
    *B60L 15/20*     (2006.01)
    *B60W 10/08*     (2006.01)

(56)     References Cited

U.S. PATENT DOCUMENTS

| | | |
|---|---|---|
| 2015/0191135 A1 | 7/2015 | Ben Noon et al. |
| 2015/0191136 A1 | 7/2015 | Ben Noon et al. |
| 2015/0191151 A1 | 7/2015 | Ben Noon et al. |
| 2015/0195297 A1 | 7/2015 | Ben Noon et al. |
| 2015/0372477 A1* | 12/2015 | Mo .................. B60L 3/0007 361/91.5 |
| 2016/0323287 A1* | 11/2016 | Kishikawa ........ H04L 12/40026 |
| 2016/0355099 A1* | 12/2016 | Fetzer .................. B60L 58/18 |
| 2017/0259761 A1 | 9/2017 | Ben Noon et al. |
| 2017/0341604 A1 | 11/2017 | Ben Noon et al. |
| 2017/0341605 A1 | 11/2017 | Ben Noon et al. |
| 2017/0355326 A1 | 12/2017 | Ben Noon et al. |
| 2018/0015888 A1 | 1/2018 | Ben Noon et al. |
| 2018/0029539 A1 | 2/2018 | Ben Noon et al. |
| 2018/0029540 A1 | 2/2018 | Ben Noon et al. |
| 2018/0213006 A1 | 7/2018 | Wakita et al. |
| 2019/0111863 A1 | 4/2019 | Ben Noon et al. |
| 2020/0377132 A1* | 12/2020 | Kitajima ................... E01B 7/20 |
| 2023/0271621 A1* | 8/2023 | Wakabayashi ........ B60W 40/02 701/300 |

FOREIGN PATENT DOCUMENTS

| | | | |
|---|---|---|---|
| JP | 2018-150884 A | | 9/2018 |
| JP | 2019041509 A | * | 3/2019 |

* cited by examiner

| | bit1 | bit2 | bit3 | bit4 |
|---|---|---|---|---|
| P | 1 | 0 | 0 | 0 |
| R | 0 | 1 | 1 | 1 |
| N | 0 | 1 | 1 | 0 |
| 1-ST SPEED | 0 | 0 | 0 | 1 |
| 2-ND SPEED | 0 | 0 | 1 | 0 |
| 3-RD SPEED | 0 | 0 | 1 | 1 |
| 4-TH SPEED | 0 | 1 | 0 | 0 |
| 5-TH SPEED | 0 | 1 | 0 | 1 |

DRIVE DEVICE

CROSS REFERENCE TO RELATED APPLICATION

The present application claims the benefit of priority from Japanese Patent Application No. 2020-147784 filed on Sep. 2, 2020. The entire disclosure of the above application is incorporated herein by reference.

TECHNICAL FIELD

The present disclosure relates to a drive device.

BACKGROUND

As an example of the drive device, there is a driver circuit according to a conceivable technique.

The driver circuit is mounted to an electronic control unit (ECU) together with a microcomputer. The driver circuit includes a driver, a microcomputer monitoring circuit, and the like. The microcomputer monitoring circuit inputs a driving permission command to the driver when the operation of the microcomputer is normal, and inputs a driving prohibition command to the driver when the operation of the microcomputer is abnormal. The driver drives a load according to a load control signal during a period in which the driving permission command is input, and stops driving of the load during a period in which the driving prohibition command is input.

SUMMARY

According to an example, a drive device includes: a control storage unit of a current value of a control signal indicating a drive state of each of loads; a drive unit of the switches according to the current value; an acquisition unit of a current drive state of each load; a determination storage unit of a transition determination value; and a determination unit that compares a correlated drive state of each load correlated with the current value with the transition determination value, and determines that the current value is abnormal when the correlated drive state and the transition determination value satisfy a predetermined corresponding relationship.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
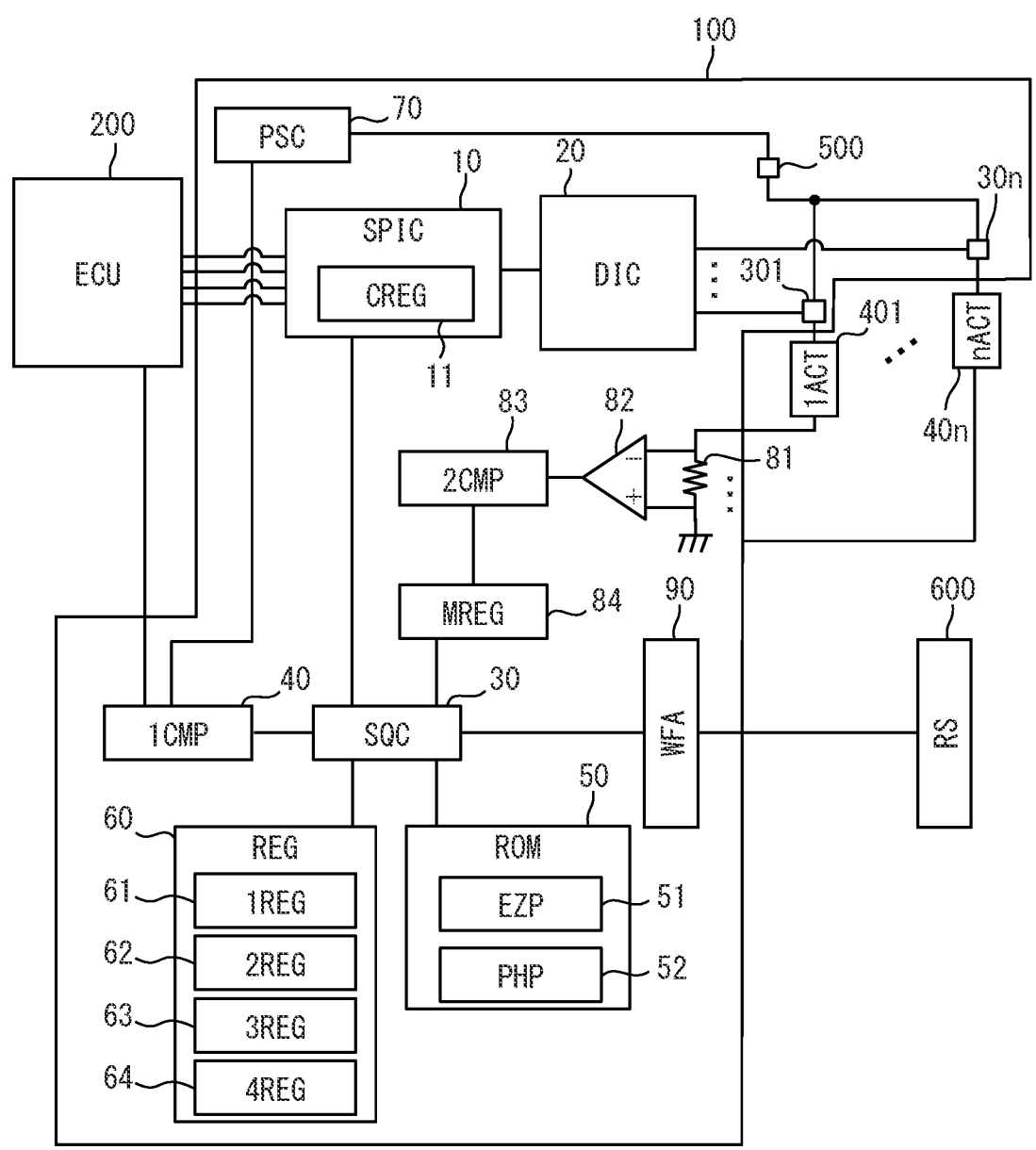
FIG. 1 is a circuit diagram showing a schematic configuration of a drive device according to a first embodiment.

In the drive device according to the conceivable technique, an abnormality may occur in the load control signal. However, the driver circuit according to the conceivable technique is incapable of determining an abnormality of the load control signal.

In view of the above points, a drive device is provided to be capable of determining an abnormality of a control signal.

The drive device disclosed herein drives multiple loads by controlling multiple semiconductor switches that correspond to the loads. The drive device includes:

- a control storage unit that stores a current value of a control signal including a signal indicating a driving state of each of the loads;
- a drive unit that controls the plurality of semiconductor switches according to the current value of the control signal;
- an acquisition unit that acquires a current driving state indicating a driving state of each of the loads at present;
- a determination storage unit that stores a transition determination value for determining whether the current value of the control signal stored in the control storage unit is abnormal, the transition determination value being correlated with driving transition from the current driving state; and
- a determination unit that compares a correlated driving state of each of the loads correlated with the current value of the control signal stored in the control storage unit with the transition determination value, and determines that the current value of the control signal is abnormal when the correlated driving state and the transition determination value satisfy a predetermined corresponding relationship.

As described above, the drive device stores the transition determination value for determining whether the current value of the control signal stored in the control storage unit is abnormal, the transition determination value being correlated with driving transition from the current driving state. The drive device is capable of determining whether the current value of the control signal is abnormal by comparing the correlated driving state of each of the loads correlated with the control signal stored in the control storage unit with the transition determination value.

As follows, multiple embodiments for implementing the present disclosure will be described with reference to the drawings. In each embodiment, portions corresponding to those described in the preceding embodiment are denoted by the same reference numerals, and redundant descriptions will be omitted in some cases. In each of the embodiments, when only a part of the configuration is described, the other parts of the configuration can be applied with reference to the other embodiments described above.

First Embodiment

A drive device 100 of the present embodiment will be described with reference to FIGS. 1 to 12. The drive device 100 is applicable to, for example, a circuit for driving a load mounted on a vehicle. Hereinafter, an example in which the drive device 100 is applied to an automatic transmission of a vehicle will be described.

<Automatic Transmission>

A schematic configuration of the automatic transmission will be described. The automatic transmission includes, for example, a valve body, a transmission mechanism, an oil pump, and a parking lock mechanism. The transmission mechanism includes multiple friction elements including, for example, a clutch and a brake. The transmission mechanism is capable of changing a gear ratio step by step by selectively engaging each friction element.

The valve body is provided with a hydraulic circuit adjusting a pressure of a hydraulic oil supplied to the transmission mechanism. The valve body includes multiple solenoid valves regulating the pressure of the hydraulic oil pumped from the oil pump and supplying the hydraulic oil to the friction elements. The solenoid valve includes a solenoid. The solenoid may be referred to as a coil. The energization of the solenoid is controlled, and thus the hydraulic oil is adjusted.

The solenoid valve corresponds to a load. In the present embodiment, solenoid valves are employed as actuators 401 to 40n that will be described later. Thus, a state of energization of the load is the same as a state of energization of the solenoid valve (solenoid). The solenoid valve may be a linear solenoid valve.

The parking lock mechanism performs a parking lock for locking rotation of an output shaft (axle) of the automatic transmission when a parking range is selected. When a shift range other than the parking range is selected from the parking lock state, the parking lock mechanism releases the parking lock. Consequently, the output shaft is unlocked. However, the configuration of the automatic transmission is not limited to the configuration described above.

<Load Driving System>

Next, a schematic configuration of a load driving system will be described with reference to FIG. 1. FIG. 1 is a diagram illustrating the load driving system. In FIG. 1, energization paths of the actuators 401 to 40n are simplified.

The load driving system includes at least the drive device 100 and an ECU 200. The load driving system controls energization driving (driving state) of the actuators 401 to 40n. That is, the load driving system controls the automatic transmission including the valve body by energizing and driving the actuators 401 to 40n.

Here, n is a natural number of 2 or greater. In the present embodiment, n=8 is employed as an example. Therefore, the present embodiment employs an example in which the first actuator 401 to the eighth actuator 408 are energized and driven. In the present embodiment, an example is employed in which the automatic transmission is switched among the first speed to the fifth speed, the P range, the R range, and the N range by controlling the driving of the first actuator 401 to the eighth actuator 408. The actuators 401 to 408 will also be referred to as actuators 40n when the actuators are not required to be particularly differentiated from each other.

However, the present disclosure is not limited thereto. The present disclosure may be employed even when shift of the automatic transmission is switched among the first speed to the fifth speed by controlling the driving of the multiple actuators 40n. The present disclosure may be employed even when the automatic transmission is switched among the P range, the R range, the N range, and the D range by controlling the driving of the multiple actuators 40n, for example. The actuator 40n may be an on-off solenoid valve.

The ECU 200 includes a microcomputer having at least one CPU, at least one storage device, and the like. Various sensors and other ECUs are connected to the ECU 200. The storage device stores programs, data, and the like. The data is data stored in advance, a sensor signal output from the sensor, or the like. The ECU stands for Electronic Control Unit.

The CPU of the ECU 200 executes the program. The CPU executes a program to perform various types of calculation processing while using data. The ECU 200 outputs a load control signal or the like as a result of the calculation processing.

In the load driving system, the drive device 100 is disposed on the valve body. That is, the drive device 100 has an electromechanical structure provided integrally with the automatic transmission. The ECU 200 is mechanically separated from the automatic transmission.

The ECU 200 and the drive device 100 are connected to each other via a copper wire or the like. In the present embodiment, the ECU 200 and the drive device 100 transmit and receive data through SPI communication. The ECU 200 transmits a load control signal or the like to the drive device 100. When the drive device 100 receives the load control signal, the drive device 100 operates according to the load control signal. A configuration and an operation of the drive device 100 will be described later in detail.

Figure 2:
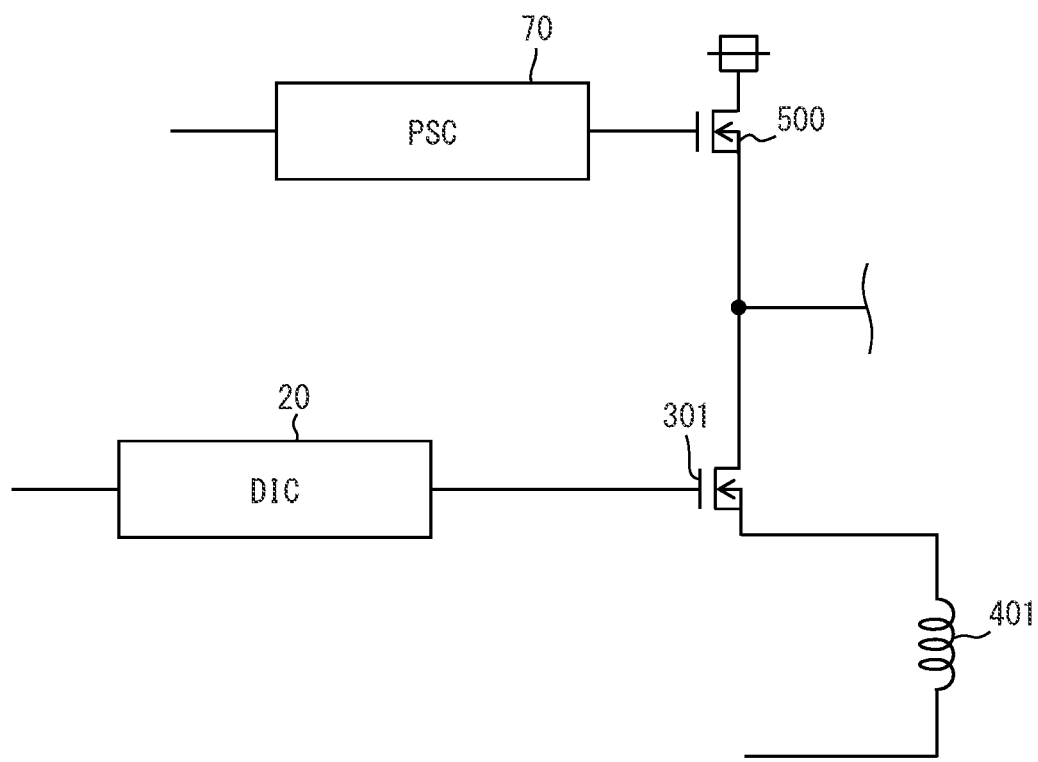
FIG. 2 is a circuit diagram showing a schematic configuration of a drive IC portion according to the first embodiment.

As illustrated in FIGS. 1 and 2, the load driving system includes multiple drive switches 301 to 30n. The drive switches 301 to 30n are respectively individually provided in the energization paths of the actuators 40n. Therefore, in the present embodiment, an example in which the first to eighth drive switches 301 to 308 are provided is employed as an example. The drive switches 301 to 308 will also be referred to as drive switches 30n when the drive switches are not required to be particularly differentiated from each other.

The drive switch 30n is provided in the drive device 100. The drive switch 30n may be included in the drive IC 20 that will be described later.

When the drive switch 30n is turned on, a current is supplied to the corresponding actuator 40n. When the drive switch 30n is turned off, the supply of current to the corresponding actuator 40n is blocked. In other words, each actuator 40n is energized when the corresponding drive switch 30n is turned on. Each of the actuators 40n is non-energized by turning off the corresponding drive switch 30n.

As illustrated in FIGS. 1 and 2, the load driving system includes a power feed switch 500. The load driving system may include various sensors. However, the load driving system need not include the power feed switch 500 and the sensor, and the power feed switch 500 and the sensor may be disposed outside the load driving system.

The power feed switch 500 is provided on the energization path of the actuator 40n. The power feed switch 500 may be a semiconductor switch such as a MOSFET. A single (common) power feed switch 500 is provided for the multiple actuators 401 to 408. When the power feed switch 500 is turned on, a current can be supplied to each of the actuators 40n. When the power feed switch 500 is turned off, the supply of current to each of the actuators 40n is blocked. The power feed switch 500 may be disposed on a high-side, that is, on a power supply side, or may be disposed on a low-side, that is, on a ground side (GND), with respect to the actuator 40n. The power feed switch 500 of the present embodiment is disposed on the high side. The power feed switch 500 is provided in the drive device 100.

The sensor outputs a signal indicating a state of the load. That is, the sensor detects a state of the automatic transmission including the valve body. The present embodiment employs an example in which the rotation sensor 600 (RS) is provided as an example of the sensor. The rotation sensor 600 includes, for example, a sensor that outputs a signal indicating a rotation speed on an input side of the automatic transmission, and a sensor that outputs a signal indicating a rotation speed on an output side thereof.

Examples of the sensor include a hydraulic pressure sensor, a rotation sensor, an oil temperature sensor, and a parking lock sensor. These sensors will be described in other embodiments.

<Configuration of Drive Device>

The drive device 100 will be described. In FIG. 2, for convenience, only a portion corresponding to one actuator 401 is illustrated.

The drive device 100 is a circuit that energizes and drives the multiple actuators 401 to 408. The drive device 100 controls the multiple drive switches 301 to 308 to energize and drive the multiple actuators 401 to 408. Unlike the ECU 200, the drive device 100 does not include a microcomputer. In other words, the drive device 100 energizes and drives the multiple actuators 401 to 408 by using a hardware logic. Each of the first to eighth drive switches 301 to 308 corresponds to a semiconductor switch.

The drive device 100 mainly includes an SPI circuit 10 including a control register 11, a drive IC 20, a first comparator 40, and a ROM 50. The drive device 100 further includes a sequence circuit 30, a register unit 60, a power feed circuit 70, a current detection resistor 81, an amplifier 82, a second comparator 83, a monitor register 84, a waveform analysis circuit 90, and the like.

The SPI circuit 10 (SPIC) is connected to the ECU 200 and performs serial communication with the ECU 200. The SPI circuit 10 is connected to the drive IC 20, the sequence circuit 30, and the like. The SPI circuit 10 includes a conversion circuit that converts received serial data into parallel data. The SPI circuit 10 includes a control register 11 (CREG). The control register 11 corresponds to a control storage unit. SPI stands for Serial Peripheral Interface.

The serial data transmitted from the ECU 200 may include a load control signal for energizing and driving the actuators 401 to 408. The load control signal corresponds to a control signal.

The load control signal includes a signal (value) indicating an energization state (driving state) of each of the actuators 401 to 408. In other words, the load control signal includes a signal indicating an energization state individually corresponding to each of the actuators 401 to 408. Also, in other words, the load control signal includes a signal indicating a driving state of each of the actuators 401 to 408.

The load control signal includes, for example, 1 as a signal indicating energization and 0 as a signal indicating non-energization. Therefore, the load control signal may be represented by 0 and 1. In the present embodiment, an 8-bit load control signal is employed as an example. However, the present disclosure is not limited to this, and any load control signal having multiple bits may be used.

Figure 5:
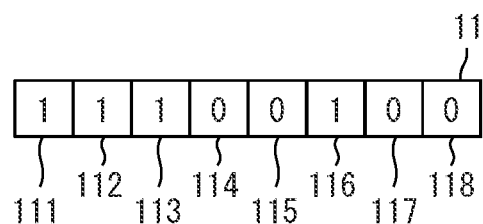
FIG. 5 is an image diagram showing a schematic configuration of a control register according to the first embodiment.

As illustrated in FIG. 5, the load control signal is converted into parallel data and stored in the control register 11. The load control signal converted into parallel data may be regarded to be a control pattern. Therefore, the load control signal may also be referred to as a control pattern. The control pattern may be represented by 1 as a signal indicating energization and 0 as a signal indicating non-energization. The control register 11 has bits 111 to 118 of addresses corresponding to the actuators 401 to 408. In the control register 11, a signal indicating a driving state of each of the actuators 401 to 408 in the load control signal is written into a bit of a corresponding address.

The first bit 111 corresponds to the first actuator 401. The second bit 112 corresponds to the second actuator 402. The third bit 113 corresponds to the third actuator 403. The fourth bit 114 corresponds to the fourth actuator 404. The fifth bit 115 corresponds to the fifth actuator 405. The sixth bit 116 corresponds to the sixth actuator 406. The seventh bit 117 corresponds to the seventh actuator 407. The eighth bit 118 corresponds to the eighth actuator 408.

At least the current value of the control pattern is stored in the control register 11. In addition to the current value of the control pattern, the previous value of the control pattern may be written in the control register 11. In this case, the control register 11 includes an area for storing the current value of the control pattern and an area for storing the previous value of the control pattern. The current value of the control pattern is a value obtained by updating the previous value of the control pattern. Therefore, the current value of the control pattern may also be referred to as an updated value of the control pattern.

As described above, the SPI circuit 10 acquires the previous value of the control pattern. Therefore, the SPI circuit 10 corresponds to an acquisition unit.

In the present embodiment, the updated value of the control pattern is employed as a correlated driving state of each of the actuators 401 to 408 correlated with the updated value of the control pattern stored in the control register 11. FIG. 5 illustrates an example in which a control pattern indicating the first speed is stored as the updated value of the control pattern. The correlated driving state may be regarded as a driving state after driving transition. Therefore, the correlated driving state may also be referred to as the next driving state.

The control pattern corresponds to a driving state of each actuator 40n. That is, the previous value of the control pattern corresponds to the current driving state indicating a driving state of each actuator 40n at present. On the other hand, the current value of the control pattern corresponds to a driving state (next driving state) after driving transition of each actuator 40n. Therefore, each of the actuators 40n is subjected to transition in a driving state by switching the control pattern from the previous value to the updated value.

In FIG. 5, as an example, the control register 11 in a state in which 11100100 (first speed) is written as the updated value of the control pattern is employed. The control pattern is compared with a transition prohibition pattern 52 as a transition determination value. Therefore, the control pattern may also be referred to as a comparison pattern. The transition prohibition pattern 52 may also be referred to as a determination pattern.

In the present embodiment, as an example, the SPI circuit 10 acquires the load control signal. However, the present disclosure is not limited to this, and the load control signal may be acquired by a communication circuit conforming to the CAN protocol. In this case, the drive device 100 is connected to the ECU 200 via a communication bus. The drive device 100 acquires the load control signal included in a message received through CAN communication. A signal indicating a driving state in the load control signal is written into the control register 11. CAN stands for Controller Area Network. CAN is a registered trademark.

In the present disclosure, the load control signal may be acquired according to levels of multiple terminals. In this case, the drive device 100 is connected to the ECU 200 via multiple copper wires. The drive device 100 is connected to the ECU 200 via copper wires of the number that is larger than the number of signals for giving instructions for driving states in the load control signal. The drive device 100 includes terminals to which the multiple copper wires are respectively connected. The drive device 100 acquires a level (Hi, Low) of each terminal as the load control signal. A signal corresponding to the level of each terminal is written into the control register 11.

As illustrated in FIGS. 1 and 2, the drive IC 20 (DIC) is connected to multiple drive switches 301 to 308. The drive IC 20 controls the multiple drive switches 301 to 308 according to control patterns. That is, the drive IC 20 outputs a drive signal for turning on and off the drive switches 301 to 308 in accordance with the control patterns stored in the control register 11. The drive IC 20 selectively turns on and off the multiple drive switches 301 to 308 in accordance with the control pattern stored in the control register 11. The drive IC 20 corresponds to a drive unit.

As the drive signal, a PWM signal may be used. In this case, the drive IC 20 may change a current (that is, a supply current) flowing through the actuator 40n by changing a duty ratio of the PWM signal. PWM stands for Pulse Width Modulation.

For example, when the control pattern is 11100100, the drive IC 20 turns on the first to third drive switches 301 to 303 and the sixth drive switch 306. Consequently, the drive IC 20 energizes the first actuator 401 to the third actuator 403 and the sixth actuator 406. In this case, the drive IC 20 turns off the fourth drive switch 304, the fifth drive switch 305, the seventh drive switch 307, and the eighth drive switch 308. Consequently, the drive IC 20 non-energizes the fourth actuator 404, the fifth actuator 405, the seventh actuator 407, and the eighth actuator 408.

Figure 8:
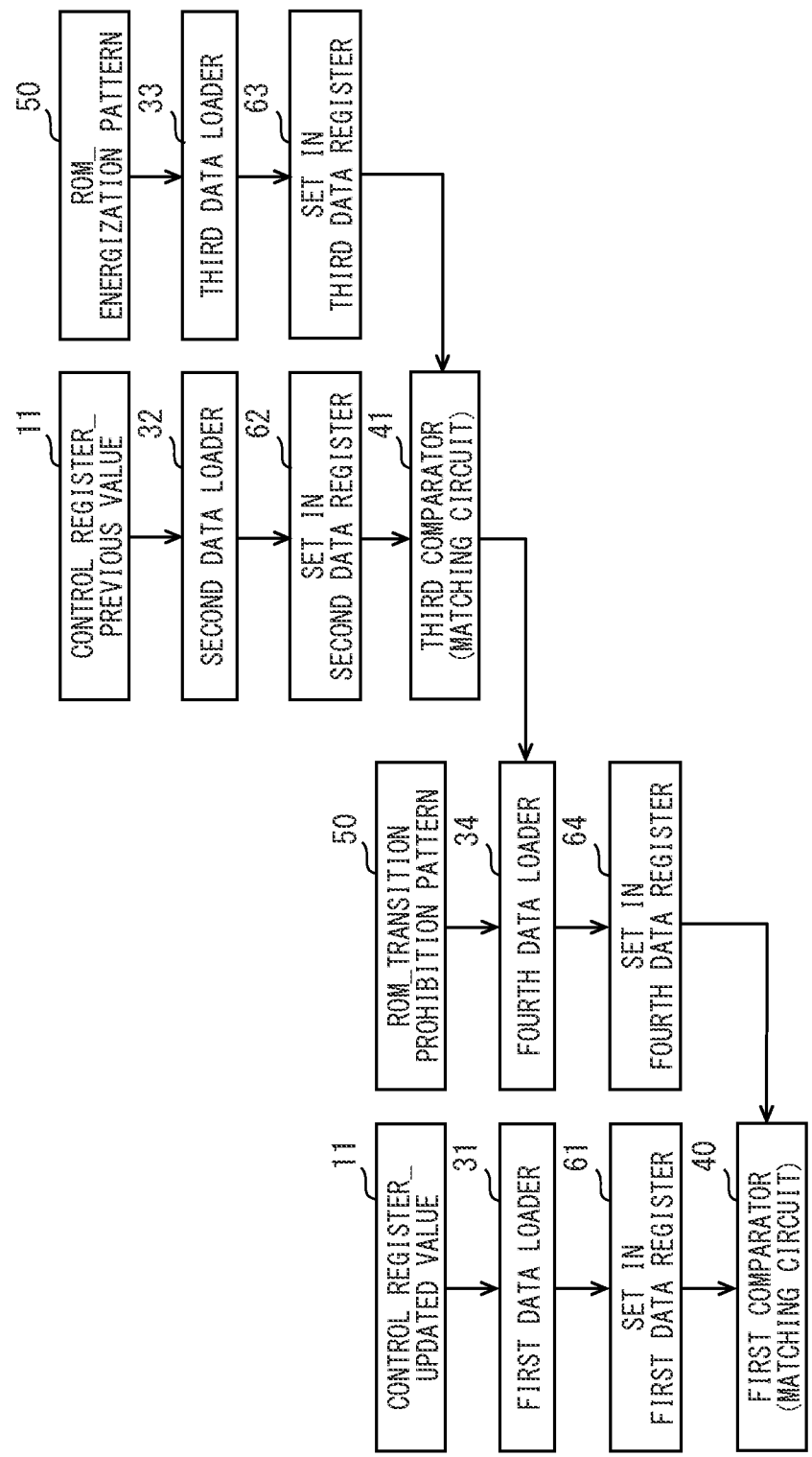
FIG. 8 is a block diagram showing the operation of a sequence circuit according to the first embodiment.

As illustrated in FIG. 8, the sequence circuit 30 (SQC) includes a first data loader 31, a second data loader 32, a third data loader 33, a fourth data loader 34, a third comparator 41, and the like. The sequence circuit 30 includes multiple switching elements and the like. The sequence circuit 30 operates in synchronization with a clock. The sequence circuit 30 operates to compare the control pattern with the determination pattern. The sequence circuit 30 corresponds to a determination unit.

Figure 11:
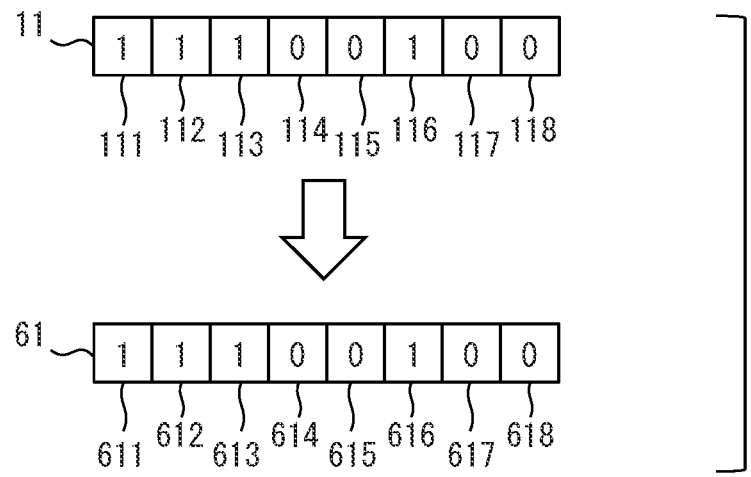
FIG. 11 is an image diagram illustrating a set operation of a control pattern (updated value) in the first embodiment.

As illustrated in FIG. 11, the first data loader 31 writes the updated value of the control pattern stored in the control register 11 into the first data register 61. That is, the first data loader 31 loads a signal of each bit in the updated value of the control register 11 and writes the signal into each bit in the first data register 61.

Figure 10:
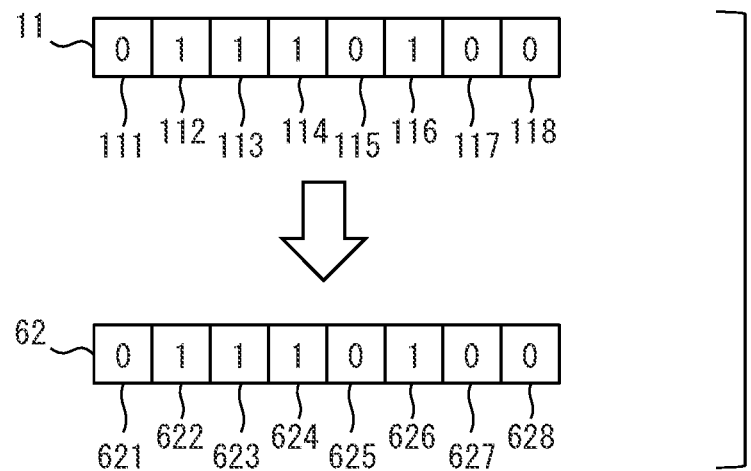
FIG. 10 is an image diagram illustrating a set operation of a control pattern (previous value) in the first embodiment.

As illustrated in FIG. 10, the second data loader 32 writes the previous value of the control pattern stored in the control register 11 into the second data register 62. That is, the second data loader 32 loads a signal of each bit in the previous value of the control register 11 and writes the signal into each bit in the second data register 62. In the present embodiment, 01110100 (fourth speed) is employed as an example of the previous value of the control pattern.

Figure 9:
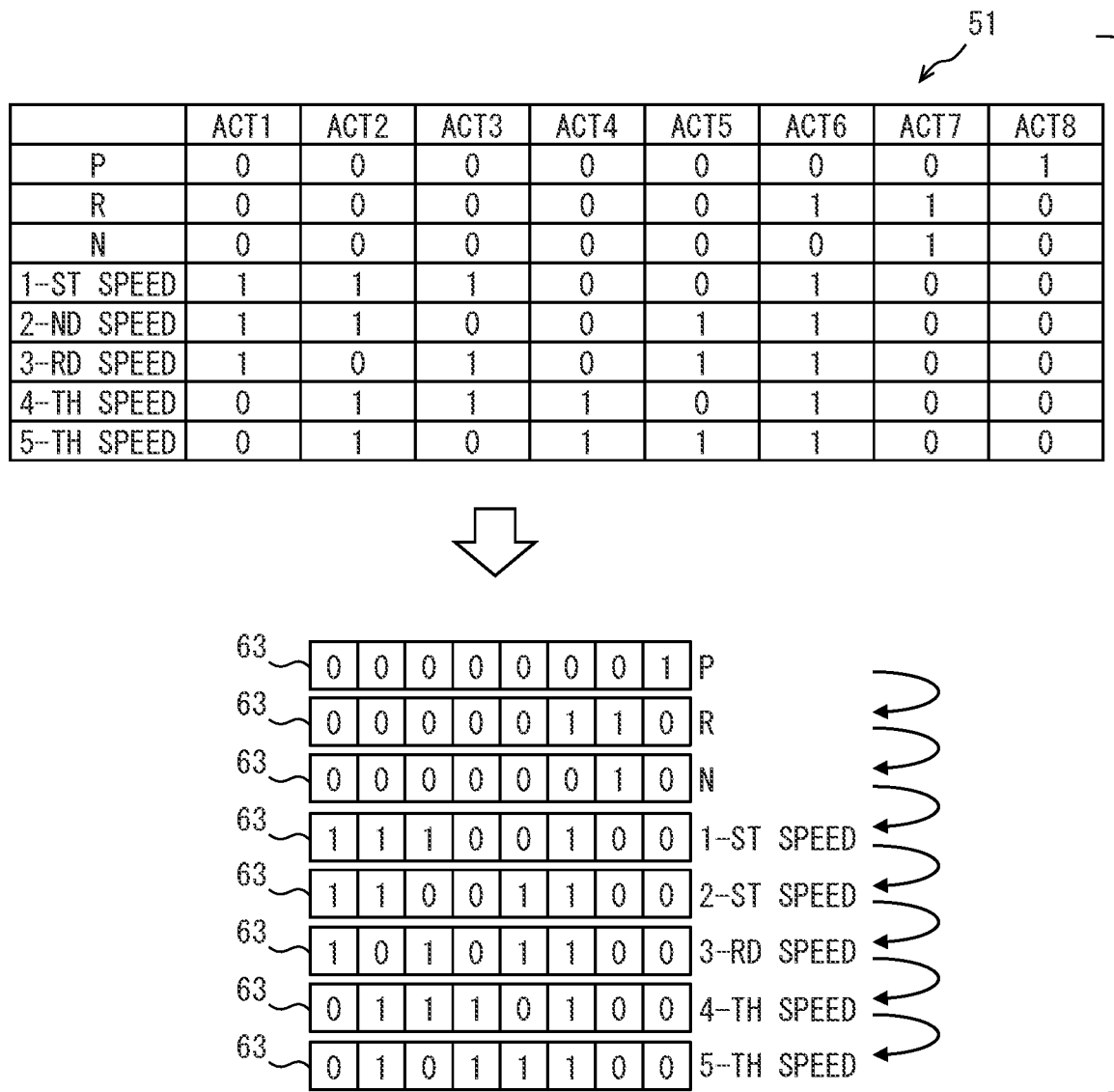
FIG. 9 is an image diagram illustrating a set operation of the energization pattern in the first embodiment.

As illustrated in FIG. 9, the third data loader 33 sequentially writes multiple energization patterns 51 stored in the ROM 50 into the third data register 63. That is, the third data loader 33 loads a signal of each bit in the energization pattern 51 and writes the signal into each bit in the third data register 63. The energization patterns 51 will be described later in detail.

The third comparator 41 sequentially compares the control pattern set in the second data register 62 with the energization patterns 51 set in the third data register 63. The third comparator 41 selects the energization pattern 51 that matches the previous value of the control pattern from among the multiple energization patterns 51. This is so that the transition prohibition pattern 52 corresponding to the previous value of the control pattern is selected. The third comparator 41 outputs a signal indicating the energization pattern 51 corresponding to the previous value of the control pattern.

It may be considered that the third comparator 41 detects that the previous value of the control pattern is a control pattern indicating the fourth speed. Also, it may be considered that the third comparator 41 determines driving transition from a driving state indicated by the previous value of the control pattern to a driving state indicated by the updated value of the control pattern.

Figure 12:
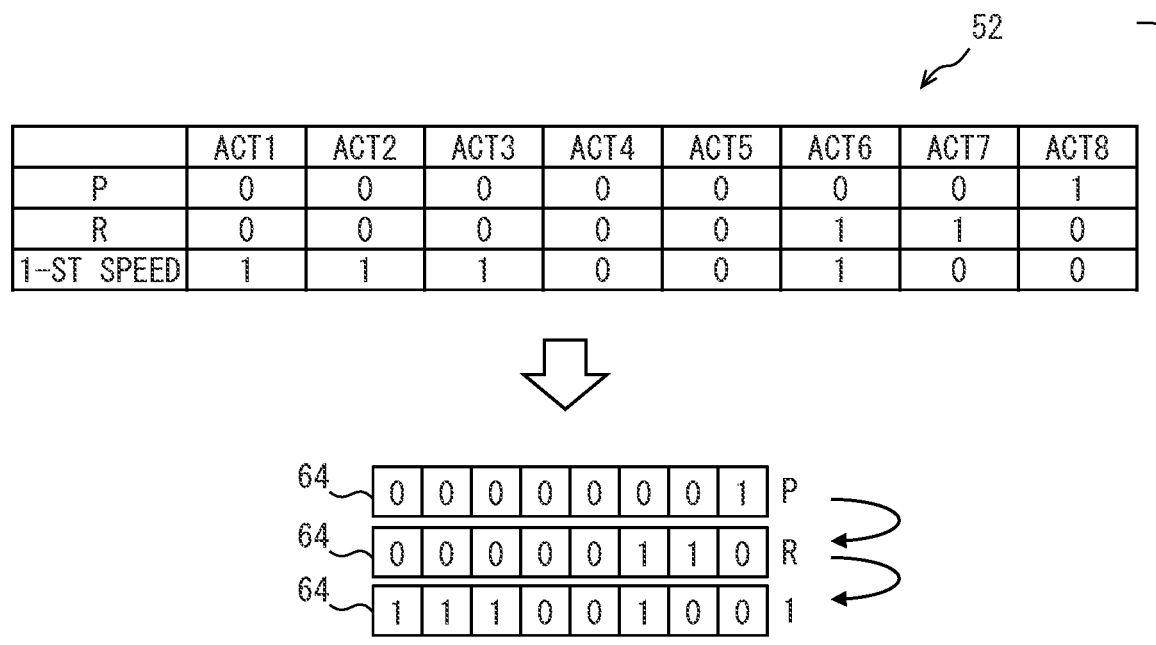
FIG. 12 is an image diagram illustrating a set operation of the transition prohibition pattern in the first embodiment.

As illustrated in FIG. 12, the fourth data loader 34 writes the transition prohibition pattern 52 stored in the ROM 50 into the fourth data register 64. The fourth data loader 34 writes the transition prohibition pattern 52 corresponding to the signal output from the third comparator 41 into the fourth data register 64. When there are multiple transition prohibition patterns 52, the fourth data loader 34 sequentially writes the transition prohibition patterns 52 into the fourth data register 64. That is, the fourth data loader 34 loads a signal of each bit in the transition prohibition pattern 52 and writes the signal into each bit in the fourth data register 64. As described above, the fourth data loader 34 acquires the transition prohibition pattern 52 associated with the control pattern from the ROM 50.

In the present embodiment, the transition prohibition pattern 52 is used as a determination pattern. The transition prohibition pattern 52 corresponds to a transition determination value and a prohibition determination value. The transition prohibition pattern 52 will be described later in detail.

The first comparator 40 (1CMP) includes a comparator or the like. The first comparator 40 compares the transition prohibition pattern 52 with the updated value of the control pattern. The first comparator 40 sequentially compares each signal of the transition prohibition pattern 52 with a corresponding signal of the control pattern. The first comparator 40 compares the transition prohibition pattern 52 and the control pattern to determine whether the transition prohibition pattern 52 and the control pattern satisfy a predetermined corresponding relationship. The first comparator 40 determines that the updated value of the control pattern is abnormal when the predetermined corresponding relationship is satisfied. The first comparator 40 corresponds to a determination unit.

As described above, in the present embodiment, the transition prohibition pattern 52 is used as a transition determination value. Therefore, when the transition prohibition pattern 52 and the updated value of the control pattern match each other, the first comparator 40 determines that the predetermined corresponding relationship is satisfied. When the transition prohibition pattern 52 and the updated value of the control pattern match each other, it indicates that the updated value of the control pattern is included in the transition prohibition pattern 52. On the other hand, when the transition prohibition pattern 52 and the updated value of the control pattern do not match each other, the first comparator 40 determines that the predetermined corresponding relationship is not satisfied.

The updated value of the control pattern matching the transition prohibition pattern 52 is a control pattern indicating driving transition from the current driving state to a prohibited driving state. Therefore, the updated value of the control pattern is an abnormal control pattern. The reason why the abnormal control pattern is stored in the control register 11 may be erroneous calculation or the like in the ECU 200.

On the other hand, the updated value of the control pattern which does not match the transition prohibition pattern 52 is a control pattern indicating driving transition from the current driving state to a driving state that is not prohibited. Therefore, the updated value of the control pattern is a normal control pattern.

Therefore, when the transition prohibition pattern 52 matches the updated value of the control pattern, the first comparator 40 determines that the updated value of the control pattern is abnormal. On the other hand, when the transition prohibition pattern 52 does not match the updated value of the control pattern, the first comparator 40 determines that the updated value of the control pattern is normal.

The first comparator 40 outputs different signals when a match is determined and when a match is not determined. In the case of matching, the first comparator 40 outputs an abnormality signal indicating that the control pattern is abnormal. The abnormality signal is output to at least one of the power feed circuit 70 and the ECU 200. When a match is not determined, the first comparator 40 outputs a normality signal indicating that the control pattern is normal. The normality signal is output to the drive IC 20 or the like.

That is, the first comparator 40 outputs an abnormality signal to the power feed circuit 70 to instruct the actuator 40n to cut off the power supply. Also, the first comparator 40 outputs the abnormality signal to the ECU 200 to notify the ECU 200 of the abnormality.

As described above, the updated value of the control pattern is input to the first comparator 40. Therefore, in the present embodiment, as an example, the first comparator 40 that compares the updated value of the control pattern stored in the control register 11 with the determination pattern is employed. However, the present disclosure is not limited to this.

The ROM 50 stores the energization pattern 51 (EZP) and the transition prohibition pattern 52 (PHP). That is, the ROM 50 includes an energization pattern memory in which the energization pattern 51 is stored and a transition prohibition pattern memory in which the transition prohibition pattern 52 is stored. The ROM 50 corresponds to a determination storage unit.

Figure 3:
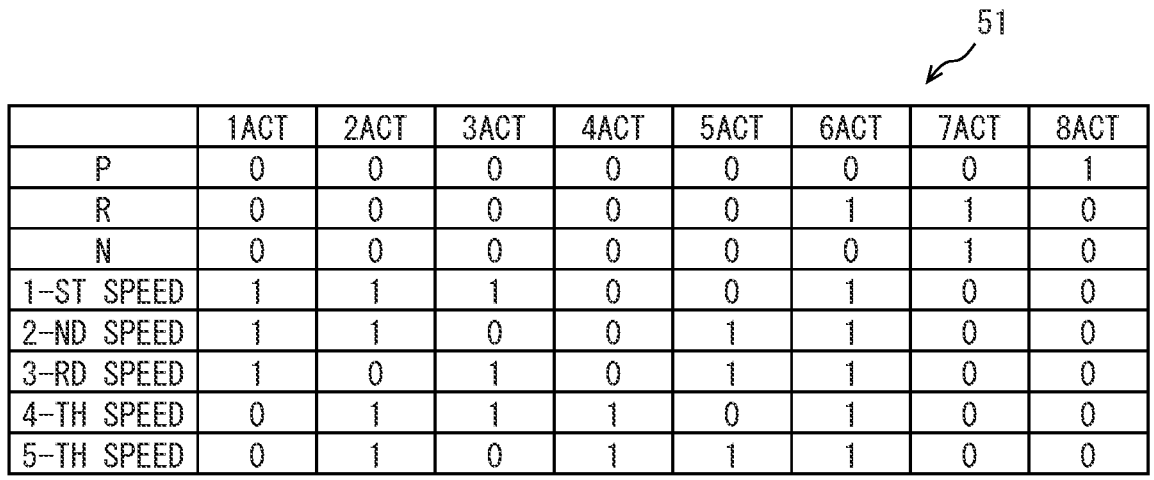
FIG. 3 is an image diagram illustrating a schematic configuration of an energization pattern in the first embodiment.

As illustrated in FIG. 3, the energization pattern 51 is a control pattern corresponding to each of all the driving states that can be taken as the driving state for each of the actuators 40n. Therefore, the ROM 50 stores multiple energization patterns 51. Each of the energization patterns 51 includes a signal indicating a driving state of each of the actuators 40n. The energization patterns 51 respectively correlates with states of the automatic transmission. When the previous value of the control pattern and the updated value of the control pattern are normal, the values are parts of the energization patterns 51.

Figure 4:
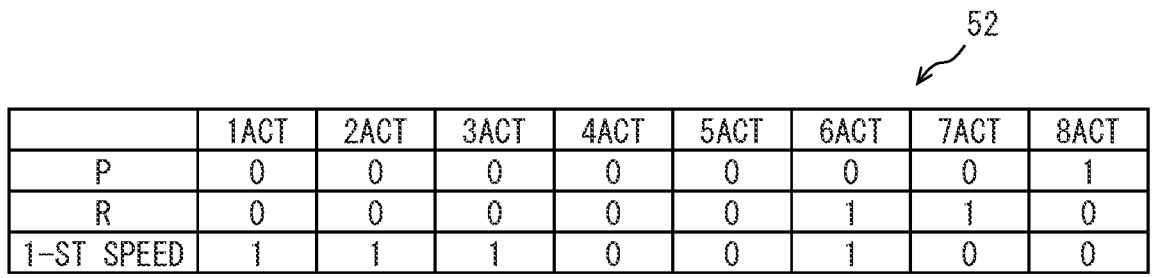
FIG. 4 is an image diagram illustrating a schematic configuration of a transition prohibition pattern in the first embodiment.

As illustrated in FIG. 4, the transition prohibition pattern 52 is the energization pattern 51 indicating a driving state of each actuator 40n. The transition prohibition pattern 52 is a value correlated with driving transition from the current driving state. The transition prohibition pattern 52 is a determination value for determining whether the updated value of the control pattern is abnormal. The ROM 50 stores the control pattern and the transition prohibition pattern 52 in association with each other.

The transition prohibition pattern 52 indicates a driving state in which driving transition from the driving state indicated by the previous value of the control pattern is prohibited. That is, the transition prohibition pattern 52 is the energization pattern 51 indicating driving transition causing an undesirable operation in the automatic transmission.

In the examples in FIGS. 4 and 12, as an example, the transition prohibition pattern 52 associated with the control pattern indicating the fourth speed is illustrated. When the automatic transmission is at the fourth speed, shift-down to the first speed results in an unintended rapid deceleration. A shift change to the R range results in an unintended reverse speed. A shift change to the P range results in unintended P lock. Therefore, the control pattern corresponding to the fourth speed is associated with the energization pattern corresponding to each of the first speed, the R range, and the P range as the transition prohibition pattern. The transition prohibition pattern 52 is stored in advance in the ROM 50, unlike the control pattern. In FIG. 12, the actuators 401 to 408 are respectively indicated by ACT1 to ACT8.

The ROM 50 has bits of addresses respectively corresponding to the actuators 401 to 408. In the ROM 50, a signal (value) indicating a driving state of each of the actuators 401 to 408 in the transition prohibition pattern 52 is written in a bit of each address. In the present embodiment, an 8-bit control pattern is employed as an example. Therefore, each transition prohibition pattern 52 has the same 8 bits as the control pattern. Each transition prohibition pattern 52 includes 1 as a signal indicating energization and 0 as a signal indicating non-energization. Therefore, each transition prohibition pattern 52 may be represented by 0 and 1.

The register unit 60 (REG) includes a first data register 61 (1REG), a second data register 62 (2REG), a third data register 63 (3REG), and a fourth data register 64 (4REG). The above-described value is set in each of the data registers 61 to 64.

As illustrated in FIGS. 1 and 2, the power feed circuit 70 (PSC) corresponds to a power supply unit. The power feed circuit 70 is a circuit switching on and off of the power feed switch 500. The power feed circuit 70 switches the power supply state for the multiple actuators 401 to 408 by turning on and off the power feed switch 500.

For example, when an abnormality signal is input from the first comparator 40, the power feed circuit 70 outputs a signal indicating that the power feed switch 500 is turned off. In other words, the power feed circuit 70 turns off the power feed switch 500 to set a power supply state for each actuator 40n to a blocked state. That is, the power feed circuit 70 turns off the power feed switch 500 in order to prevent each actuator 40n from being driven by an abnormal control pattern. The abnormality signal is a signal for instructing the power feed switch 500 to be turned off. On the other hand, when the updated value of the control pattern is normal, the power feed circuit 70 turns on the power feed switch 500 to set the power supply state for each actuator 40n into a power feed state.

The current detection resistor 81 forms a current detection unit together with the amplifier 82. The current detection unit is provided individually for each actuator 40n. Therefore, in the present embodiment, eight current detection units are provided in the drive device 100. In FIG. 1, as a representative example, only a current detection unit corresponding to the first actuator 401 is illustrated.

Each current detection unit detects a current actually flowing through the corresponding actuator 40n (solenoid). In other words, each current detection unit detects a driving state of the corresponding actuator 40n. That is, the current detection units respectively monitor energization states of the actuators 40n.

In addition to the current detection resistor 81 and the amplifier 82, the current detection unit may include a filter that removes noise of a voltage amplified by the amplifier 82. The filter may include, for example, a resistor and a capacitor.

The current detection resistor 81 is connected in series to the actuator 401. The current detection resistor 81 is provided on the ground side (downstream side) with respect to the first actuator 401. The amplifier 82 amplifies a voltage generated across the current detection resistor 81 and proportional to the current. Therefore, the amplifier 82 outputs a voltage signal proportional to the current flowing through the first actuator 401. Thus, each current detection unit outputs a voltage signal proportional to a current flowing through the corresponding actuator 40n.

The second comparator 83 (2CMP) includes a comparator or the like. The second comparator 83 is provided individually for each actuator 40n. The second comparator 83 is provided in a set along with the current detection resistor 81 and the amplifier 82. In the present embodiment, eight second comparators 83 are provided in the drive device 100. In FIG. 1, as a representative example, only the second comparator 83 corresponding to the first actuator 401 is illustrated.

The second comparator 83 compares the voltage signal output from the amplifier 82 with a reference value. The second comparator 83 outputs a positive value when the voltage signal is more than the reference value, and outputs a negative value when the voltage signal is less than the reference value. That is, the second comparator 83 outputs a monitoring result indicating an energization state of each actuator 40n monitored by the corresponding current detection unit. The second comparator 83 outputs a positive value, for example, when the first actuator 401 is energized. The second comparator 83 outputs a negative value, for example, when the first actuator 401 is not energized.

Figure 6:
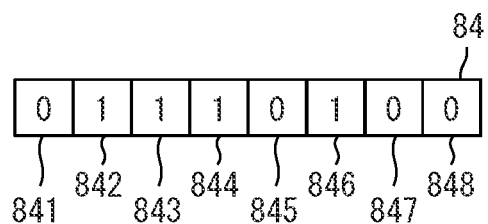
FIG. 6 is an image diagram illustrating a schematic configuration of a monitor register in the first embodiment.
Figure 7:
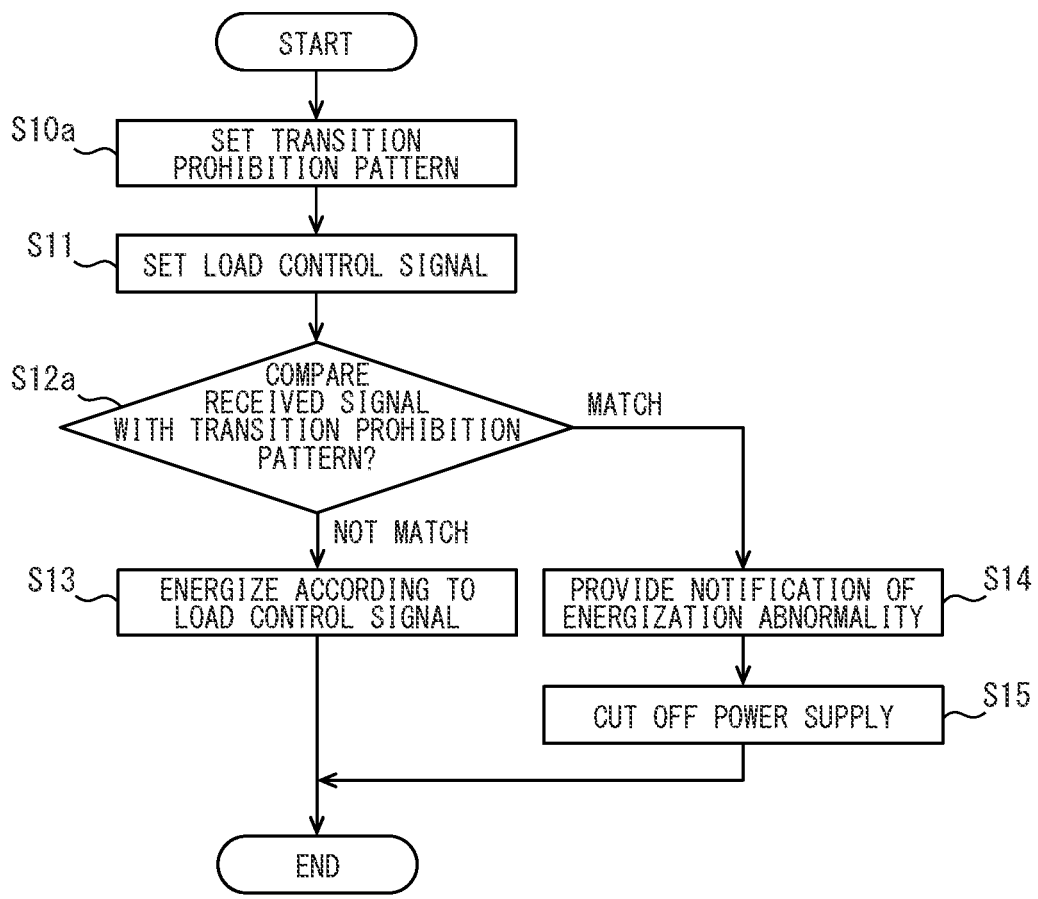
FIG. 7 is a flowchart showing the operation of the drive device according to the first embodiment.

As illustrated in FIG. 6, the output from each second comparator 83 is written into the monitor register 84 (MREG). That is, the monitor register 84 stores a monitor pattern as a result of monitoring an energization state of each actuator 40n. The monitor pattern may be regarded as the current driving state. The monitor pattern may also be regarded as a correlated driving state. The monitor register 84 may also be referred to as a monitoring storage unit. In FIG. 6, as an example, the monitor register 84 in which a monitor pattern indicating the fourth speed is stored is employed.

As described above, the drive device 100 may acquire the current driving state of each actuator 40n by using the current detection resistor 81, the amplifier 82, the second comparator 83, and the monitor register 84. In the present embodiment, as the current driving state, a monitor pattern may be used instead of the previous value of the control pattern. These constituent elements 81 to 84 correspond to an acquisition unit. However, in the present disclosure, constituent elements 81 to 84 may be omitted. In particular, the monitor register 84 need not be provided.

The monitor register 84 has bits of addresses corresponding to the actuators 401 to 408. In the monitor register 84, signals (values) indicating energization states of the actuators 401 to 408 are respectively written into the bits of the addresses. The signal indicating the energization state of each of the actuators 401 to 408 is an output from the corresponding second comparator 83.

In the monitor register 84, for example, 1 is written as a signal indicating energization, and 0 is written as a signal indicating non-energization. Thus, the monitor pattern may be represented by 0 and 1. In the present embodiment, an 8-bit control pattern is employed as an example. Therefore, the monitor pattern has the same 8 bits as those of the control pattern.

A first bit 841 in the monitor register 84 corresponds to the first actuator 401. Similarly, second to eighth bits 842 to 848 respectively correspond to the second to eighth actuators 402 to 408.

The monitor pattern is a result of monitoring an energization state of each actuator 40n. Thus, when there is no abnormality, the monitor pattern and the control pattern are the same pattern. For example, when the control pattern is 01110100, the monitor pattern is 01110100. However, when at least one of the monitor pattern and the control pattern is abnormal, the monitor pattern and the control pattern are different patterns.

A rotation sensor signal that is an output from the rotation sensor 600 is input to the waveform analysis circuit 90. The waveform analysis circuit 90 determines a vehicle speed based on the rotation sensor signal [pls/s]. The waveform analysis circuit 90 determines, for example, whether a vehicle speed is high, low, or 0 (stopped).

The waveform analysis circuit 90 determines that the vehicle speed is high when the rotation sensor signal reaches a preset threshold. The waveform analysis circuit 90 determines that the speed is low when the rotation sensor signal does not reach the preset threshold and is not 0. The waveform analysis circuit 90 determines that a vehicle is stopped when the rotation sensor signal is 0.

Therefore, the vehicle speed may be regarded as the current driving state of each actuator 40n. Therefore, the waveform analysis circuit 90 corresponds to an acquisition unit. However, in the present disclosure, the waveform analysis circuit 90 may be omitted.

<Operation of Drive Device>

An operation of the drive device 100 will be described. When a load drive signal is received, the drive device 100 starts an operation illustrated in the flowchart of FIG. 7. In this case, it is assumed that the power feed circuit 70 outputs a signal indicating that the power feed switch 500 is turned on. That is, each actuator 40n is capable of supplying a current.

In step S10a, a transition prohibition pattern is set. As described above, the second data loader 32, the third data loader 33, and the fourth data loader 34 select the transition prohibition pattern 52 corresponding to the previous value of the control pattern from the ROM 50, and set the transition prohibition pattern 52 in the fourth data register 64.

When multiple transition prohibition patterns 52 are stored in the ROM 50, the fourth data loader 34 sequentially writes the transition prohibition patterns 52 stored in the ROM 50 into the fourth data register 64. When the transition prohibition pattern 52 written in the fourth data register 64 is output to the first comparator 40, the fourth data loader 34 writes the next transition prohibition pattern 52 into the fourth data register 64.

In step S11, the load control signal is set. As described above, the first data loader 31 loads the updated value of the control pattern that is the load control signal from the control register 11. The first data loader 31 sets the loaded updated value of the control pattern in the first data register 61. When the control pattern is set in the first data register 61, the control pattern is output to the first comparator 40.

In step S12a, a received signal is compared with the transition prohibition pattern. The received signal is the updated value of the control pattern. The first comparator 40 compares the updated value of the control pattern set in the first data register 61 with the transition prohibition pattern 52 set in the fourth data register 64. When multiple transition prohibition patterns 52 are stored in the ROM 50, the first comparator 40 sequentially compares the updated value of the control pattern with each of the transition prohibition patterns 52. Consequently, the first comparator 40 compares the updated value of the control pattern with all of the transition prohibition patterns 52.

When the first comparator 40 determines that the updated value of the control pattern does not match any of the transition prohibition patterns 52, the process proceeds to step S13. In this case, the updated value of the control pattern may be regarded to be normal.

On the other hand, when the first comparator 40 determines that the updated value of the control pattern matches the transition prohibition pattern 52, the process proceeds to step S14. That is, when the first comparator 40 determines that at least one of the transition prohibition patterns 52 matches the updated value of the control pattern, the process proceeds to step S14. In this case, the updated value of the control pattern may be regarded to be abnormal.

In the present embodiment, 11100100 is employed as the updated value of the control pattern. In the present embodiment, three transition prohibition patterns illustrated in FIGS. 4 and 12 are employed as the transition prohibition patterns 52. Therefore, the updated value of the control pattern matches the third transition prohibition pattern 52. Therefore, the first comparator 40 determines that the updated value of the control pattern matches the transition prohibition pattern 52.

In step S13, energization is performed in accordance with the load control signal. The first comparator 40 outputs a normality signal indicating that the updated value of the control pattern is normal. When the normality signal is input, the drive IC 20 energizes the actuator 40n in accordance with the load control signal. That is, the drive IC 20 selectively turns on and off the drive switches 301 to 308 in accordance with the updated value of the control pattern stored in the control register 11. Consequently, the drive IC 20 selectively energizes the actuator 40n.

In step S14, a notification of an abnormality is provided. The first comparator 40 outputs an abnormality signal indicating that the updated value of the control pattern is abnormal to the ECU 200. Consequently, the first comparator 40 notifies the ECU 200 of the abnormality.

In step S15, the power supply is cut off. The first comparator 40 outputs an abnormality signal indicating that the updated value of the control pattern is abnormal to the power feed circuit 70. The first comparator 40 outputs the abnormality signal to the power feed circuit 70, and thus gives an instruction for cutting off the power supply to the actuator 40n. When the abnormality signal is input, the power feed circuit 70 turns off the power feed switch 500 to block the supply of current to each actuator 40n. Consequently, the drive device 100 is capable of preventing the actuator 40n from being driven by the abnormal control pattern.

In the present disclosure, at least one of step S14 and step S15 may be performed.

The first comparator 40 may output the abnormality signal to the drive IC 20 instead of outputting the abnormality signal to the power feed circuit 70. In this case, the drive IC 20 selectively turns on and off the drive switches 301 to 308 in accordance with the previous value of the control pattern. Consequently, the drive IC 20 selectively energizes the actuator 40n.

<Effect>

As described above, the drive device 100 stores the transition prohibition pattern 52. The drive device 100 is capable of determining whether the updated value of the control pattern is abnormal by comparing the updated value of the control pattern with the transition prohibition pattern 52.

As the determination pattern, a transition permission pattern indicating a driving state in which driving transition from the driving state indicated by the previous value of the control pattern is permitted may be employed. However, the drive device 100 stores the transition prohibition pattern 52 in the ROM 50 as the determination pattern. The transition prohibition pattern 52 has a smaller number of patterns than that of the transition permission pattern. Therefore, the drive device 100 is capable of reducing a capacity occupied by the determination pattern in the ROM 50.

Unlike the ECU 200, the drive device 100 does not include a microcomputer. Thus, the drive device 100 is capable of being made smaller in size than a configuration including a microcomputer. The drive device 100 is capable of reducing power consumption and heat generation compared with a configuration including a microcomputer. Consequently, the drive device 100 is capable of reducing restrictions on the body size and the mountability due to heat generation compared with a configuration including a microcomputer. That is, the drive device 100 is capable of improving the degree of freedom of mounting compared with a configuration including a microcomputer. The drive device 100 is capable of reducing functional safety and security coping compared with a configuration including a microcomputer. The drive device 100 is capable of being disposed in the immediate vicinity of the actuator 40n, and thus it is possible to reduce a wire harness and to improve the mountability.

The transition prohibition pattern 52 and a comparison target of the transition prohibition pattern 52 are not limited to the above. For example, as shown in Modification Example 1 in FIG. 13, a transition pattern in which a previous value and an updated value of a control pattern are arranged may be employed as a comparison target of the transition prohibition pattern 52. In this case, the transition prohibition pattern 52 may employ a pattern obtained by arranging the previous value of the control pattern and an energization pattern indicating a driving state in which driving transition from a driving state indicated by the previous value is prohibited. The first comparator 40 compares the transition pattern with the transition prohibition pattern 52.

Figures 13, 14:
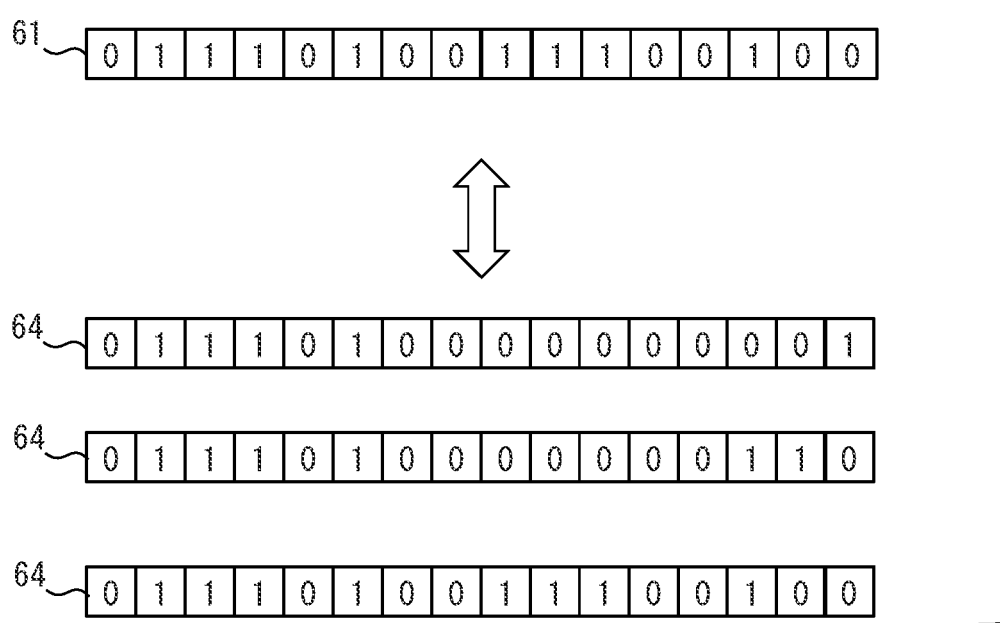
FIG. 13 is an image diagram illustrating a transition prohibition pattern in Modification Example 1.
FIG. 14 is an image diagram illustrating a transition prohibition pattern in Modification Example 2.

In the example in FIG. 13, as an example, a transition pattern in which a control pattern indicating the fourth speed as the previous value of the control pattern and a control pattern indicating the first speed as the updated value are arranged is illustrated. In this case, the transition prohibition pattern 52 employs a pattern obtained by arranging a control pattern indicating the fourth speed and a control pattern indicating the P range, arranging a control pattern indicating the fourth speed and a control pattern indicating the R range, and arranging a control pattern indicating the fourth speed and a control pattern indicating the first speed.

The transition prohibition pattern 52 and a comparison target of the transition prohibition pattern 52 may employ even patterns converted into identifiers. For example, as shown in Modification Example 2 in FIG. 14, a control pattern (an updated value and a previous value) and the transition prohibition pattern 52 employ patterns converted into 4-bit identifiers. The first comparator 40 compares an identifier into which the updated value of the control pattern is converted with an identifier into which the transition prohibition pattern 52 is converted.

Modification Examples 1 and 2 may be implemented in combination. In this case, the transition pattern is a pattern obtained by arranging an identifier into which the previous value of the control pattern is converted with an identifier into which an updated value of the control pattern is converted. Similarly, the transition prohibition pattern 52 is a pattern obtained by arranging an identifier into which the previous value of the control pattern is converted and an identifier into which an energization pattern indicating a driving state in which driving transition from a driving state indicated by the previous value is prohibited is converted.

The preferred embodiment of the present disclosure has been described above. However, the present disclosure is not limited to the above embodiment, and various modifications are possible without departing from the spirit of the present disclosure. Hereinafter, as other forms of the present disclosure, second to tenth embodiments will be described. The above-described embodiment and the second to tenth embodiments may be implemented independently or in combination as appropriate. The present disclosure is not limited to the combinations described in the embodiments, and may be implemented in various combinations.

Second Embodiment

A drive device 100 of a second embodiment will be described with reference to FIG. 15. In the present embodiment, description will focus on portions different from the embodiment described above. The portions similar to the embodiment described above may be employed as appropriate. This also applies to the following embodiments.

The drive device 100 of the present embodiment has the same configuration as that in the first embodiment. Therefore, in the present embodiment, the same reference numerals as in the first embodiment are used. The present embodiment is different from the first embodiment in that a transition permission pattern is used instead of the transition prohibition pattern 52.

The ROM 50 stores an energization pattern 51 and a transition permission pattern. That is, the ROM 50 includes an energization pattern memory in which the energization pattern 51 is stored and a transition permission pattern memory in which the transition permission pattern is stored. The ROM 50 corresponds to a determination storage unit.

The transition permission pattern is an energization pattern indicating a driving state of each actuator 40n. The transition permission pattern is a value correlated with driving transition from the current driving state. The transition permission pattern is a determination value for determining whether an updated value of a control pattern is abnormal. The ROM 50 stores the control pattern and the transition permission pattern in association with each other.

The transition permission pattern indicates a driving state in which driving transition from a driving state indicated by the previous value of the control pattern is permitted. That is, the transition permission pattern indicates driving transition permission from the current driving state. In other words, the transition permission pattern is an energization pattern indicating driving transition causing an operation permitted for the automatic transmission. The transition permission pattern corresponds to a transition determination value or a permission determination value.

Figure 15:
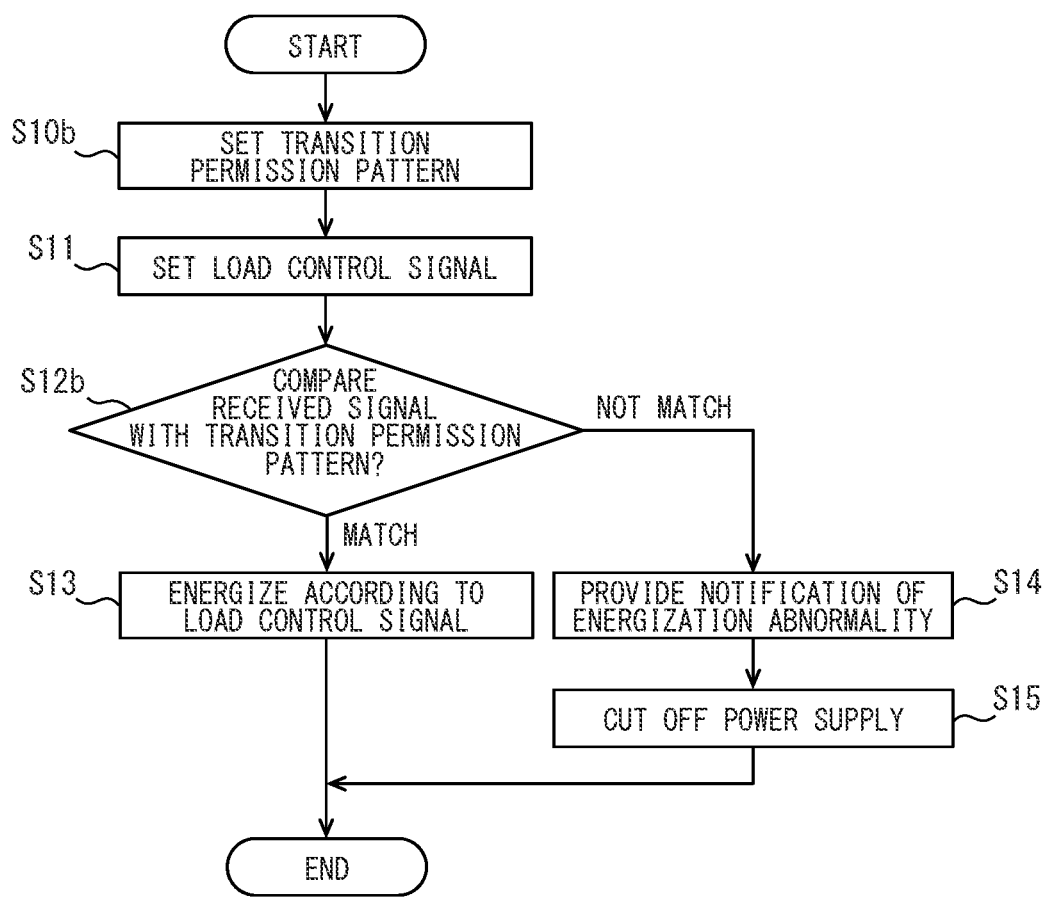
FIG. 15 is a flowchart showing the operation of the drive device according to the second embodiment.

When a load drive signal is received, the drive device 100 starts an operation illustrated in the flowchart of FIG. 15. In FIG. 15, the same step numbers are assigned to the same processes as in FIG. 7.

In step S10b, a transition permission pattern is set. The sequence circuit 30 sets the transition permission pattern in the fourth data register 64 in the same manner as setting the transition prohibition pattern 52. That is, the sequence circuit 30 selects the transition permission pattern corresponding to the previous value of the control pattern from the ROM 50 and sets the transition permission pattern in the fourth data register 64.

In Step S12b, a received signal is compared with the transition permission pattern. The received signal corresponds to the updated value of the control pattern. The first comparator 40 compares the updated value of the control pattern set in the first data register 61 with the transition permission pattern set in the fourth data register 64 (determination unit). When multiple transition permission patterns are stored in the ROM 50, comparison is performed in the same manner as in the above embodiment.

When the first comparator 40 determines that the updated value of the control pattern matches at least one transition permission pattern, the process proceeds to step S13. In this case, the updated value of the control pattern may be regarded to be normal. As described above, the first comparator 40 determines that a predetermined corresponding relationship is not satisfied when the updated value of the control pattern matches at least one transition permission pattern.

On the other hand, when the first comparator 40 determines that the updated value of the control pattern does not match any of the transition permission patterns, the process proceeds to step S14. In this case, the updated value of the control pattern may be regarded to be abnormal. As described above, the first comparator 40 determines that the predetermined corresponding relationship is satisfied when the updated value of the control pattern does not match any of the transition permission patterns. When the transition permission pattern and the updated value of the control pattern do not match each other, it indicates that the updated value of the control pattern is not included in the transition permission pattern.

The drive device 100 of the second embodiment is capable of achieving the same effect as that of the drive device 100 of the first embodiment.

Third Embodiment

A drive device 100 of a third embodiment will be described with reference to FIG. 16. For example, the drive device 100 of the present embodiment has the same configuration as that in the first embodiment. Therefore, in the present embodiment, the same reference numerals as in the first embodiment are used.

The present embodiment is different from the first embodiment in that a vehicle speed determined by the waveform analysis circuit 90 is used as the current driving state instead of the previous value of the control pattern. Therefore, the drive device 100 of the present embodiment is required to include the waveform analysis circuit 90.

The transition prohibition pattern 52 is stored in association with a vehicle speed that is determined by the waveform analysis circuit 90 and is the current driving state. The transition prohibition pattern 52 is stored in association with signals indicating respective vehicle speeds indicated by, for example, 0 and 1. For example, the transition prohibition pattern 52 associated with a high speed employs an energization pattern indicating the first speed, the P range, and the R range. The transition prohibition pattern 52 associated with a low speed employs an energization pattern indicating the P range and the R range. The transition prohibition pattern 52 associated with the stopped state employs an energization pattern indicating the third speed and the fourth speed. The transition prohibition pattern 52 corresponds to a transition determination value or a prohibition determination value.

Figure 16:
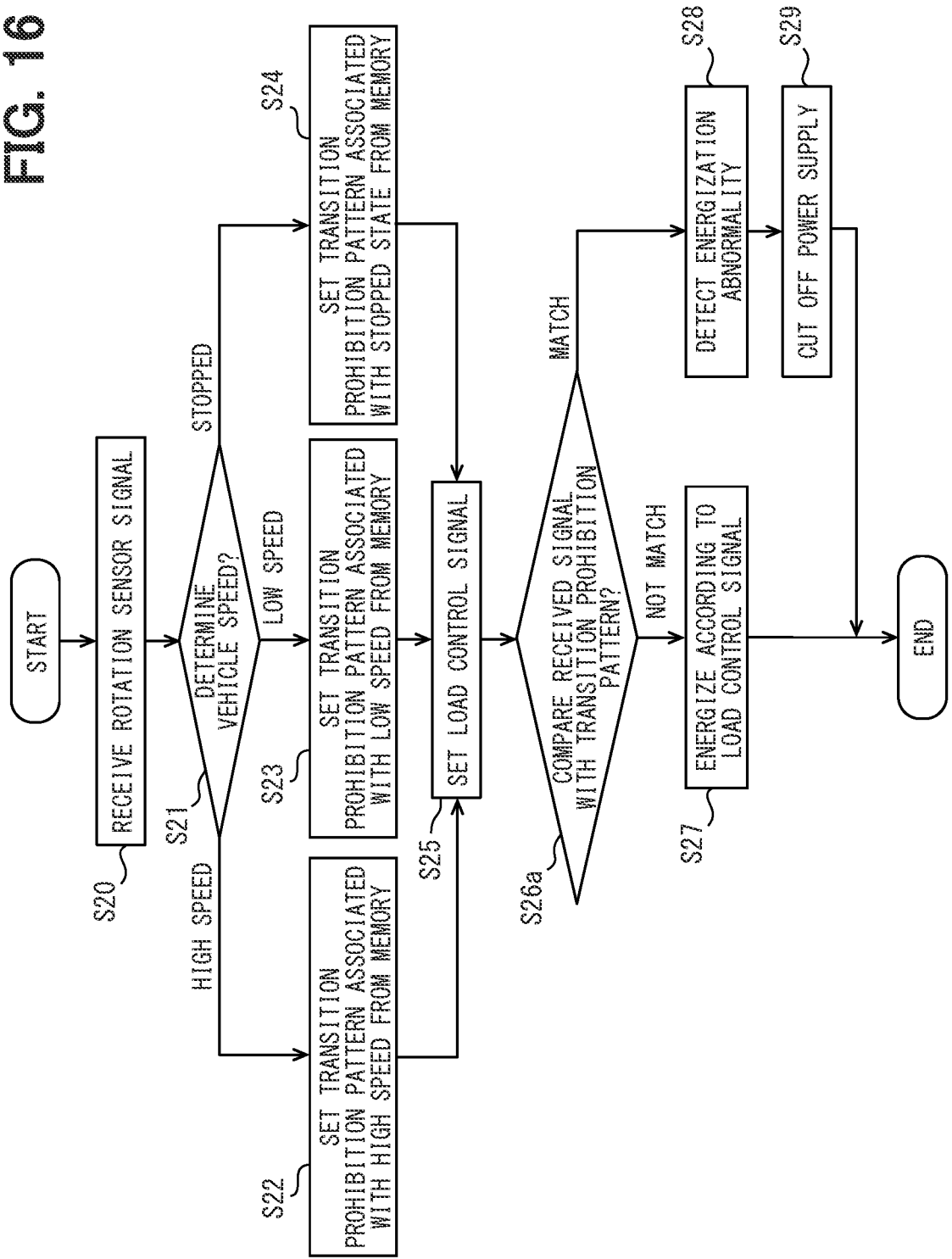
FIG. 16 is a flowchart showing the operation of the drive device according to the third embodiment.

When a load drive signal is received, the drive device 100 starts an operation illustrated in the flowchart of FIG. 16. Step S25 is the same as step S11. Step S26a is the same as step S12a. Steps S27 to S29 are the same as steps S13 to S15.

In step S20, a rotation sensor signal is received. The waveform analysis circuit 90 receives the rotation sensor signal from the rotation sensor 600.

In step S21, a vehicle speed is determined. The waveform analysis circuit 90 determines the vehicle speed from the received rotation sensor signal. When the waveform analysis circuit 90 determines that the vehicle speed is high, the process proceeds to step S22. When the waveform analysis circuit 90 determines that the vehicle speed is low, the process proceeds to step S23. When the waveform analysis circuit 90 determines that the vehicle is stopped, the process proceeds to step S24.

In step S22, a transition prohibition pattern associated with the high speed is set from the memory. The sequence circuit 30 sets the transition prohibition pattern 52 associated with the high speed from the ROM 50 in the fourth data register 64.

In step S23, the transition prohibition pattern associated with the low speed is set from the memory. The sequence circuit 30 sets the transition prohibition pattern 52 associated with the low speed from the ROM 50 in the fourth data register 64.

In step S24, a transition prohibition pattern associated with the stopped state is set from the memory. The sequence circuit 30 sets the transition prohibition pattern 52 associated with the stopped state from the ROM 50 in the fourth data register 64.

As described above, the sequence circuit 30 acquires the transition prohibition pattern 52 associated with the vehicle speed acquired by the waveform analysis circuit 90 from the ROM 50. The memory in steps S22 to S24 is a transition prohibition pattern memory in the ROM 50.

The drive device 100 of the third embodiment is capable of achieving the same effect as that the drive device 100 of the first embodiment.

Fourth Embodiment

A drive device 100 of a fourth embodiment will be described with reference to FIG. 17. The drive device 100 of the present embodiment has the same configuration as that in the first embodiment. Therefore, in the present embodiment, the same reference numerals as in the first embodiment are used. In the present embodiment, in the same manner as in the third embodiment, a vehicle speed determined by the waveform analysis circuit 90 is used as the current driving state. Therefore, the drive device 100 of the present embodiment is required to include the waveform analysis circuit 90. In the present embodiment, in the same manner as in the second embodiment, a transition permission pattern is used as a transition determination value.

The transition permission pattern is stored in association with a vehicle speed that is determined by the waveform analysis circuit 90 and is the current driving state. The transition permission pattern is stored in association with signals indicating respective vehicle speeds indicated by, for example, 0 and 1. The transition permission pattern associated with the high speed employs an energization pattern indicating the second speed, the third speed, and the fourth speed. The transition permission pattern associated with the low speed employs an energization pattern indicating the first speed, the second speed, and the third speed. The transition permission pattern associated with the stopped state employs an energization pattern indicating the first speed, the second speed, the P range, and the R range. The transition permission pattern corresponds to a transition determination value or a permission determination value.

Figure 17:
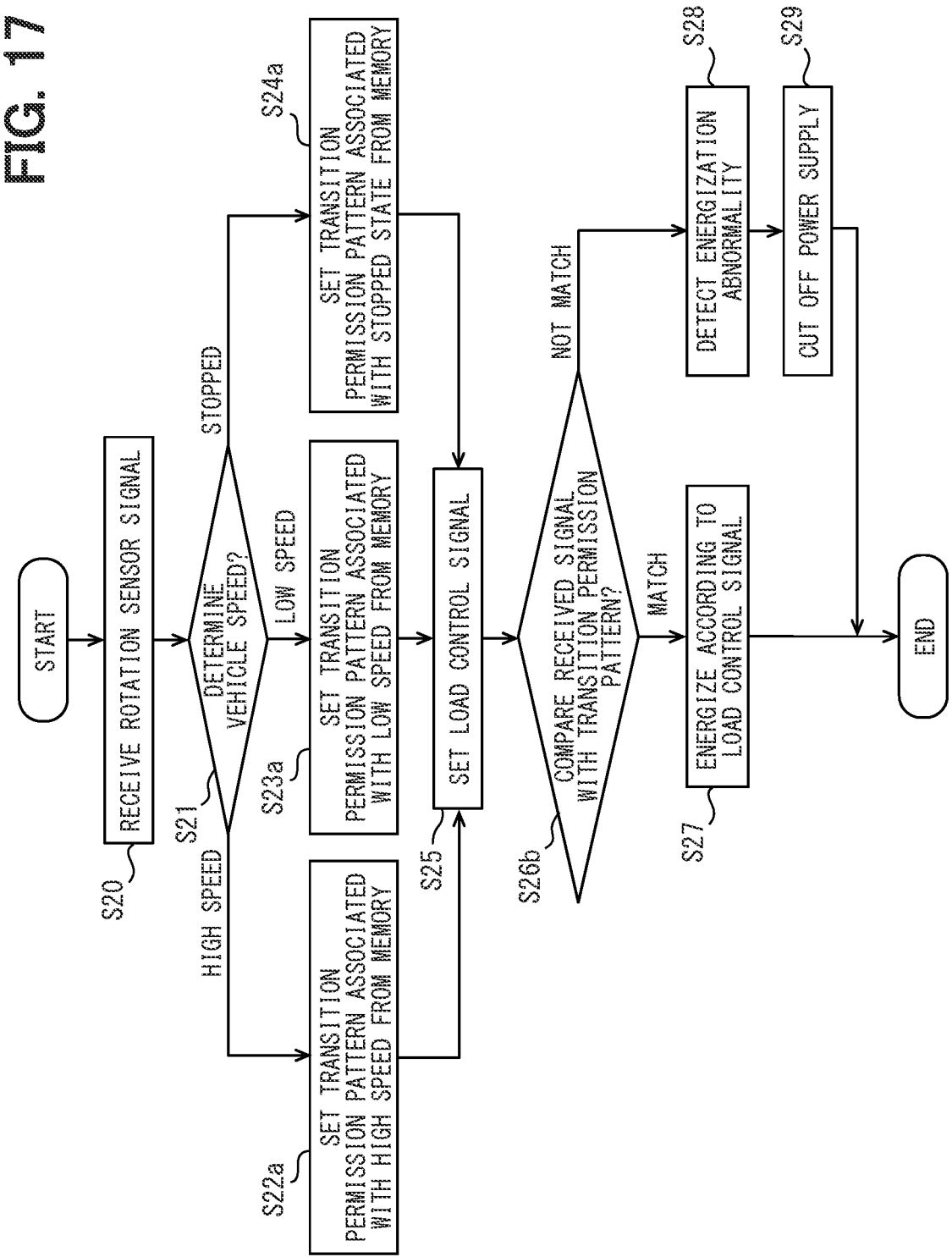
FIG. 17 is a flowchart showing the operation of the drive device according to the fourth embodiment.

When a load drive signal is received, the drive device 100 starts an operation illustrated in the flowchart of FIG. 17. In FIG. 17, the same step numbers are assigned to the same processes as in FIG. 16. Note. Step S26b is the same as step S12b.

In step S22a, a transition permission pattern associated with the high speed is set from the memory. The sequence circuit 30 sets the transition permission pattern associated with the high speed from the ROM 50 in the fourth data register 64.

In step S23a, the transition permission pattern associated with the low speed is set from the memory. The sequence circuit 30 sets the transition permission pattern associated with the low speed from the ROM 50 in the fourth data register 64.

In step S24a, the transition permission pattern associated with the stopped state is set from the memory. The sequence circuit 30 sets the transition permission pattern associated with the stopped state from the ROM 50 in the fourth data register 64.

As described above, the sequence circuit 30 acquires the transition permission pattern associated with the vehicle speed acquired by the waveform analysis circuit 90 from the ROM 50. The memory in steps S22a to S24a is a transition permission pattern memory in the ROM 50.

The drive device 100 of the fourth embodiment is capable of achieving the same effects as those of the drive devices 100 of the first, second, and third embodiments.

Fifth Embodiment

A drive device 100 of a fifth embodiment will be described with reference to FIG. 18. The drive device 100 of the present embodiment has the same configuration as that in the first embodiment. Therefore, in the present embodiment, the same reference numerals as in the first embodiment are used. The present embodiment is different from the first embodiment in that a monitor pattern stored in the monitor register 84 is used as a correlated driving state instead of the updated value of the control pattern. Therefore, the drive device 100 of the present embodiment is required to include the current detection resistor 81, the amplifier 82, the second comparator 83, and the monitor register 84. The transition prohibition pattern 52 of the present embodiment is the same as that in the first embodiment.

Figure 18:
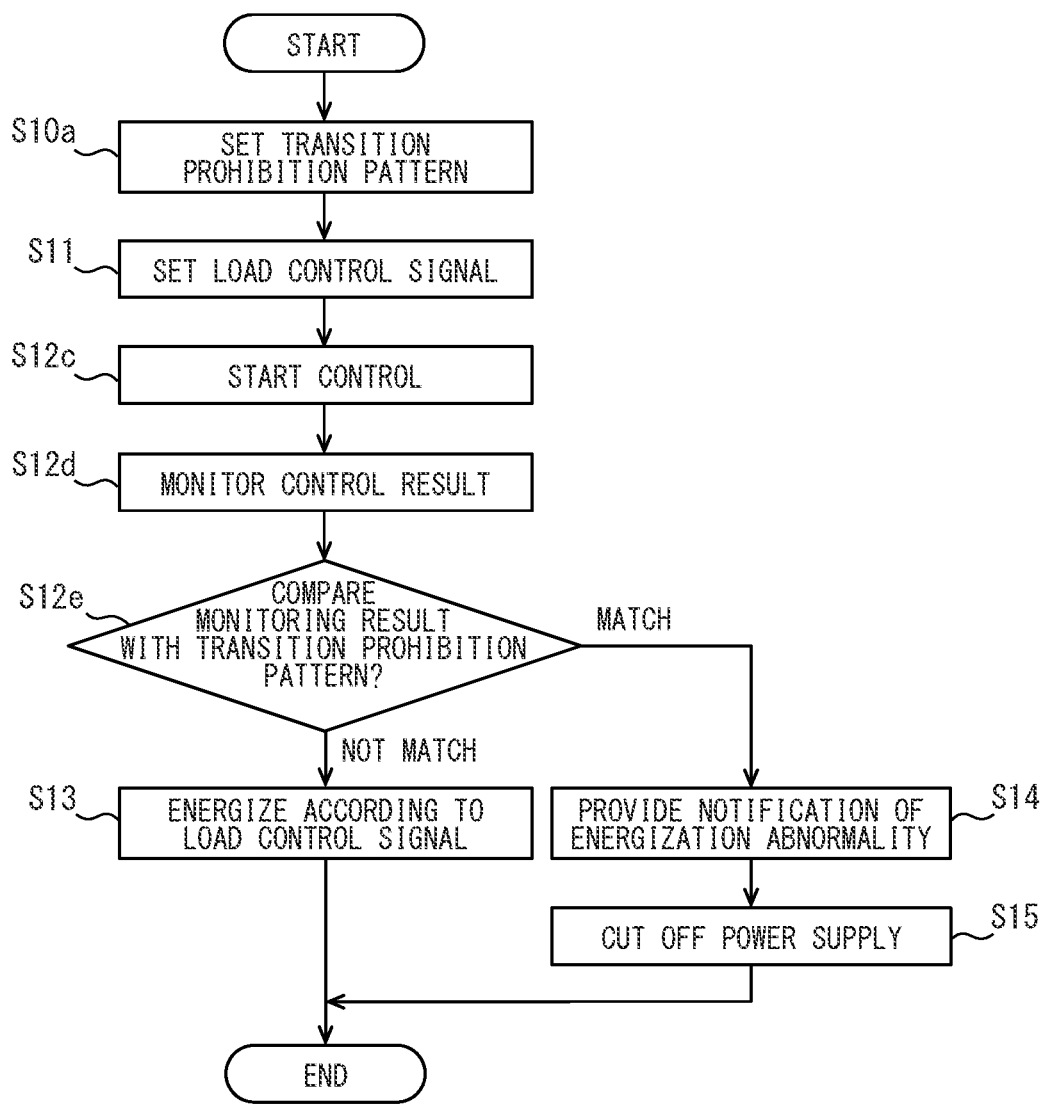
FIG. 18 is a flowchart showing the operation of the drive device according to the fifth embodiment.

When a load drive signal is received, the drive device 100 starts an operation illustrated in the flowchart of FIG. 18. In FIG. 18, the same step numbers are assigned to the same processes as in FIG. 7.

In step S12c, control is started. The drive IC 20 selectively turns on and off the drive switches 301 to 308 in accordance with the updated value of the control pattern stored in the control register 11. Consequently, the drive IC 20 selectively energizes the actuator 40n. It may be regarded that the drive IC 20 performs control in order to acquire the monitor pattern.

In step S12d, a control result is monitored. The drive device 100 stores the monitor pattern into the monitor register 84 by operating the current detection resistor 81, the amplifier 82, and the second comparator 83 as described above.

In step S12e, a monitoring result is compared with the transition prohibition pattern. The monitoring result corresponds to the monitor pattern. The first comparator 40 compares the monitor pattern set in the first data register 61 with the transition prohibition pattern 52 set in the fourth data register 64. When multiple transition prohibition patterns 52 are stored in the ROM 50, comparison is performed in the same manner as in the above embodiment.

When the first comparator 40 determines that the monitor pattern does not match any of the transition prohibition patterns 52, the process proceeds to step S13. In this case, the monitor pattern is regarded to be normal. Since the monitor pattern is normal, the updated value of the control pattern is regarded to be normal.

On the other hand, when the first comparator 40 determines that the monitor pattern matches the transition prohibition pattern 52, the process proceeds to step S14. That is, when the first comparator 40 determines that at least one of the transition prohibition patterns 52 matches the monitor pattern, the process proceeds to step S14. In this case, the monitor pattern is regarded to be abnormal. Since the monitor pattern is abnormal, the updated value of the control pattern is regarded to be abnormal.

The drive device 100 of the fifth embodiment is capable of achieving the same effect as that of the drive device 100 of the first embodiment. For example, even when the automatic transmission is actually instructed to transition from the fourth speed to the P range, the automatic transmission does not immediately transition to the P range due to a response of a hydraulic pressure or the like. Thus, the drive device 100 may use the monitor pattern instead of the updated value of the control pattern.

Sixth Embodiment

A drive device 100 of a sixth embodiment will be described with reference to FIG. 19. The drive device 100 of the present embodiment has the same configuration as that in the first embodiment. Therefore, in the present embodiment, the same reference numerals as in the first embodiment are used. In the present embodiment, in the same manner as in the fifth embodiment, the monitor pattern stored in the monitor register 84 is used as a correlated driving state instead of the updated value of the control pattern. In the present embodiment, in the same manner as in the second embodiment, a transition permission pattern is used as a transition determination value.

Figure 19:
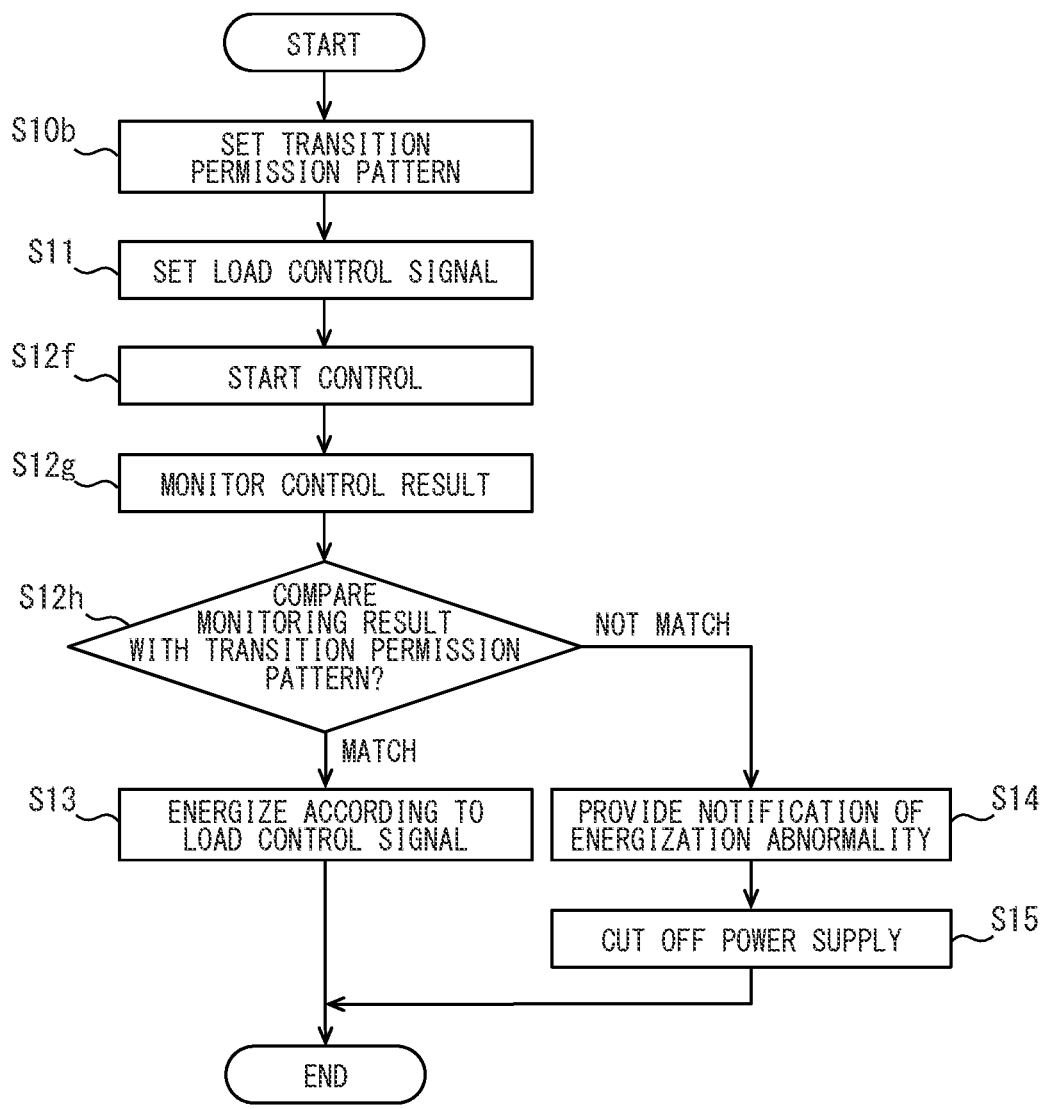
FIG. 19 is a flowchart showing the operation of the drive device according to the sixth embodiment.

When a load drive signal is received, the drive device 100 starts an operation illustrated in the flowchart of FIG. 19. In FIG. 19, the same step numbers are assigned to the same processes as in FIGS. 7 and 15. Steps S12f and S12g are the same as steps S12c and S12d.

In step S12h, a monitoring result and the transition permission pattern are compared with each other. The monitoring result corresponds to the monitor pattern. The first comparator 40 compares the monitor pattern set in the first data register 61 with the transition permission pattern set in the fourth data register 64. When multiple transition permission patterns are stored in the ROM 50, comparison is performed in the same manner as in the above embodiment.

When the first comparator 40 determines that the monitor pattern matches the at least one transition permission pattern, the process proceeds to step S13. In this case, the monitor pattern is regarded to be normal. As described above, the first comparator 40 determines that the predetermined corresponding relationship is not satisfied when the monitor pattern matches the at least one transition permission pattern.

On the other hand, when the first comparator 40 determines that the monitor pattern does not match any of the transition permission patterns, the process proceeds to step S14. In this case, the monitor pattern is regarded to be abnormal. As described above, the first comparator 40 determines that the predetermined corresponding relationship is satisfied when the monitor pattern does not match any of the transition permission patterns. When the transition permission pattern and the monitor pattern do not match each other, it indicates that the monitor pattern is not included in the transition permission pattern.

The drive device 100 of the sixth embodiment is capable of achieving the same effects as those of the drive devices 100 of the first, second, and fifth embodiments.

Seventh Embodiment

A drive device 100 of a seventh embodiment will be described with reference to FIG. 20. The drive device 100 of the present embodiment has the same configuration as that in the first embodiment. Therefore, in the present embodiment, the same reference numerals as in the first embodiment are used.

In the present embodiment, in the same manner as in the third embodiment, a vehicle speed determined by the waveform analysis circuit 90 is used as the current driving state. Therefore, the drive device 100 of the present embodiment is required to include the waveform analysis circuit 90. The transition prohibition pattern 52 of the present embodiment is the same as that in the third embodiment.

In the present embodiment, in the same manner as in the fifth embodiment, the monitor pattern is used as a correlated driving state. Therefore, the drive device 100 of the present embodiment is required to include the current detection resistor 81, the amplifier 82, the second comparator 83, and the monitor register 84.

Figure 20:
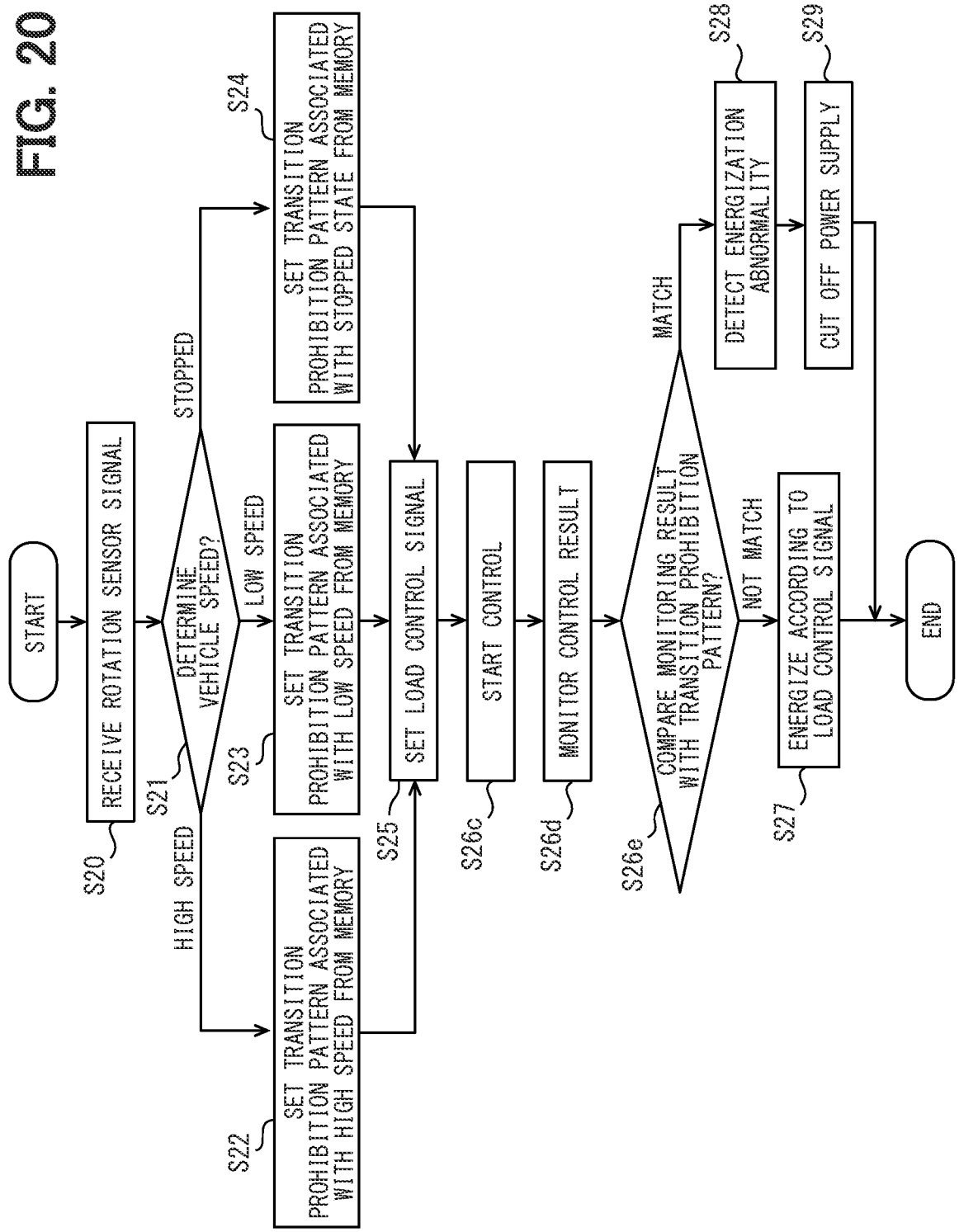
FIG. 20 is a flowchart showing the operation of the drive device according to the seventh embodiment.

When a load drive signal is received, the drive device 100 starts an operation illustrated in the flowchart of FIG. 20. In FIG. 20, the same step numbers are assigned to the same processes as in FIGS. 16 and 18. Steps S26c to S26e are the same as steps S12c to S12e.

The drive device 100 of the seventh embodiment is capable of achieving the same effects as those of the drive devices 100 of the first, third, and fifth embodiments.

Eighth Embodiment

A drive device 100 of an eighth embodiment will be described with reference to FIG. 21. The drive device 100 of the present embodiment has the same configuration as that in the first embodiment. Therefore, in the present embodiment, the same reference numerals as in the first embodiment are used.

In the present embodiment, in the same manner as in the fourth embodiment, a vehicle speed determined by the waveform analysis circuit 90 is used as the current driving state. Therefore, the drive device 100 of the present embodiment is required to include the waveform analysis circuit 90. The transition permission pattern of the present embodiment is the same as that of the fourth embodiment.

In the present embodiment, in the same manner as in the sixth embodiment, the monitor pattern is used as a correlated driving state. Therefore, the drive device 100 of the present embodiment is required to include the current detection resistor 81, the amplifier 82, the second comparator 83, and the monitor register 84.

Figure 21:
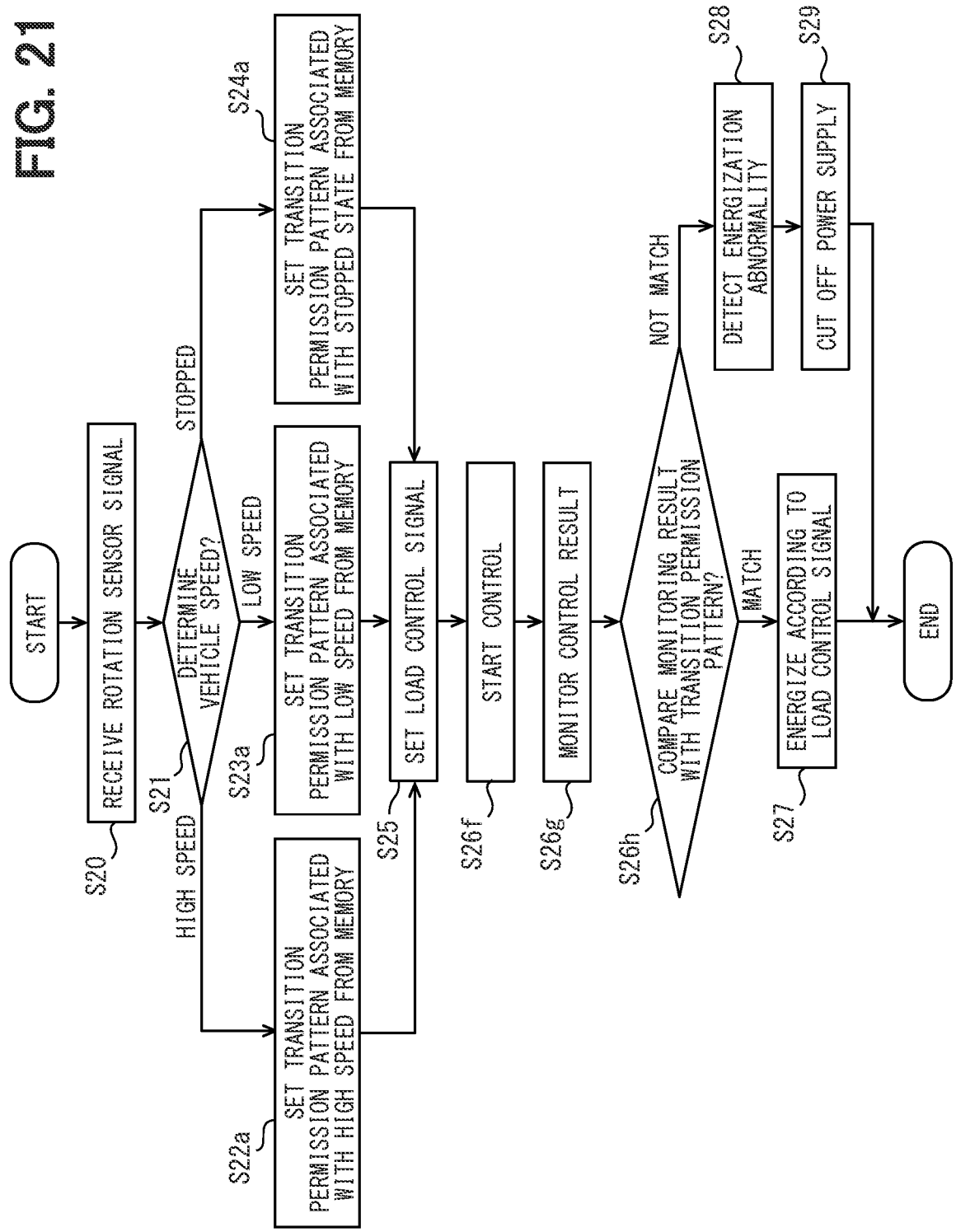
FIG. 21 is a flowchart showing the operation of the drive device according to the eighth embodiment.

When a load drive signal is received, the drive device 100 starts an operation illustrated in the flowchart of FIG. 21. In FIG. 21, the same step numbers are assigned to the same processes as in FIGS. 17 and 19. Steps S26f to S26h are the same as steps S12f to S12h.

The drive device 100 of the eighth embodiment is capable of achieving the same effects as those of the drive devices 100 of the first, fourth, and sixth embodiments.

Ninth Embodiment

Figure 22:
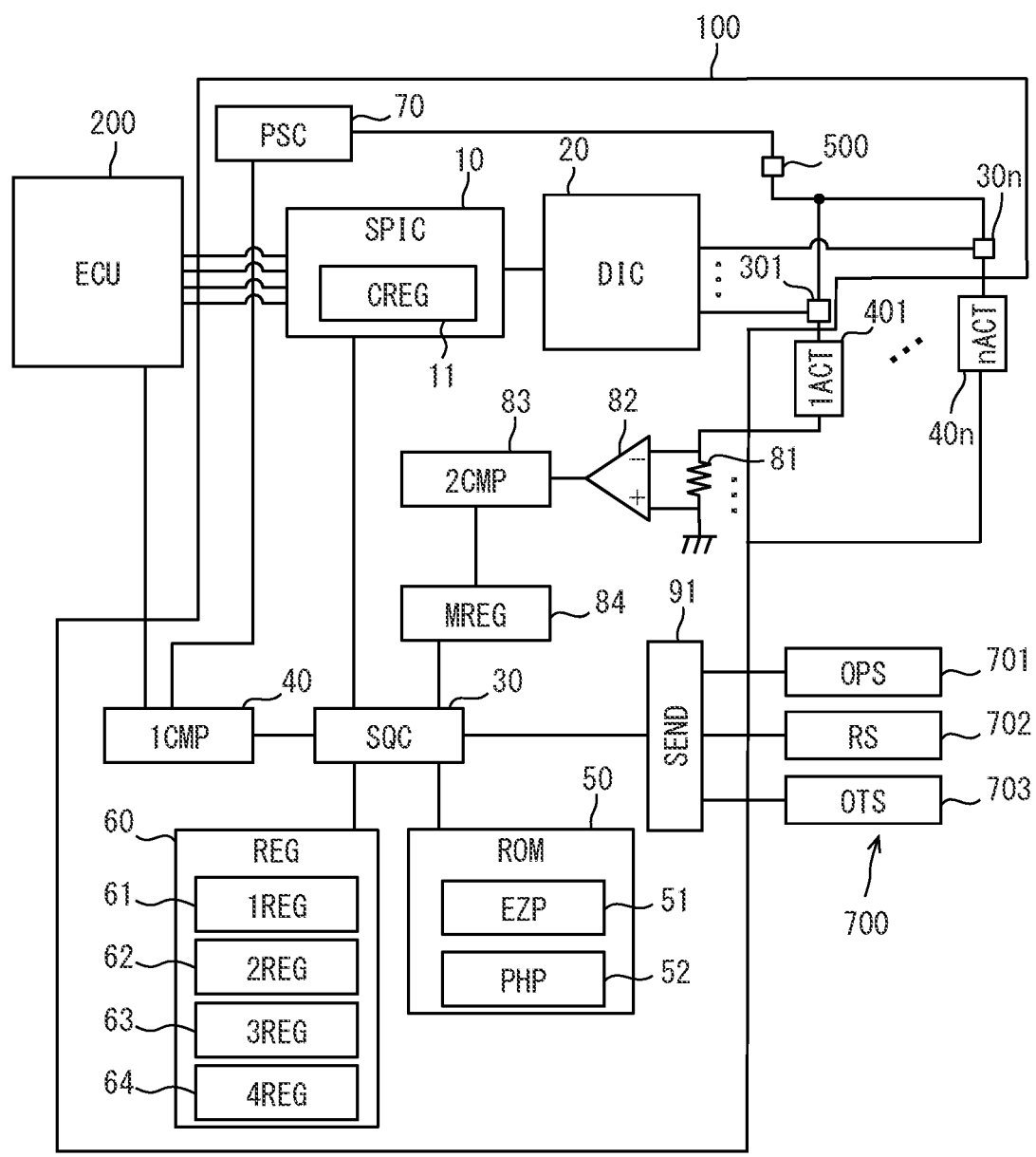
FIG. 22 is a circuit diagram showing a schematic configuration of a drive device according to a ninth embodiment.

A drive device 100 of a ninth embodiment will be described with reference to FIG. 22. The present embodiment is different from the first embodiment in that each detection result from a sensor detection circuit 91 is used as the current driving state instead of the previous value of the control pattern. The drive device 100 of the present embodiment is different from the drive device 100 of the first embodiment in that the sensor detection circuit 91 is provided. The sensor detection circuit 91 is connected to a sensor 700.

The sensor 700 of the present embodiment includes a hydraulic pressure sensor 701 (OPS), a rotation sensor 702 (RS), and an oil temperature sensor 703 (OTS). The hydraulic pressure sensor 701 outputs a signal indicating a pressure of a hydraulic oil in the hydraulic circuit. The rotation sensor 702 outputs a signal indicating a rotation speed of the automatic transmission. The rotation sensor 702 includes, for example, a sensor that outputs a signal indicating a rotation speed on an input side of the automatic transmission, and a sensor that outputs a signal indicating a rotation speed on an output side thereof. The oil temperature sensor 703 outputs a signal indicating a temperature of the hydraulic oil in the hydraulic circuit.

The sensor detection circuit 91 (SEND) detects a signal from the sensor 700. The sensor detection circuit 91 performs predetermined processing such as waveform detection and A/D conversion on an input signal from the sensor 700. The sensor detection circuit 91 detects a state of the load, that is, a state of the automatic transmission including the valve body. That is, the state of the automatic transmission including the valve body is regarded to be the current driving state indicating a driving state of each actuator 40n at present. Similarly, each detection result from the sensor detection circuit 91 is regarded to be the current driving state. The sensor detection circuit 91 corresponds to an acquisition unit.

Each detection result from the sensor detection circuit 91 may be represented by, for example, 0 and 1. The sensor detection circuit 91 outputs each detection result to the sequence circuit 30. The sensor detection circuit 91 may write each detection result into the monitor register 84.

The ROM 50 stores the detection results and the transition prohibition pattern 52 in association with each other. Instead of the transition prohibition pattern 52, a transition permission pattern may be stored in the ROM 50 in association with each detection result. Here, as an example, the transition prohibition pattern 52 is employed.

The sequence circuit 30 determines the current driving state based on each detection result. The sequence circuit 30 sets the transition prohibition pattern 52 associated with each detection result in the fourth data register 64.

The first comparator 40 compares the updated value of the control pattern or the monitor pattern with the transition prohibition pattern 52 in the same manner as in the above embodiments. The first comparator 40 determines that the updated value of the control pattern is abnormal when the updated value of the control pattern matches the transition prohibition pattern 52, and determines that the updated value of the control pattern is normal when the updated value does not match the transition prohibition pattern 52.

The drive device 100 of the eighth embodiment is capable of achieving the same effect as that of the drive device 100 of the first embodiment.

Tenth Embodiment

Figure 23:
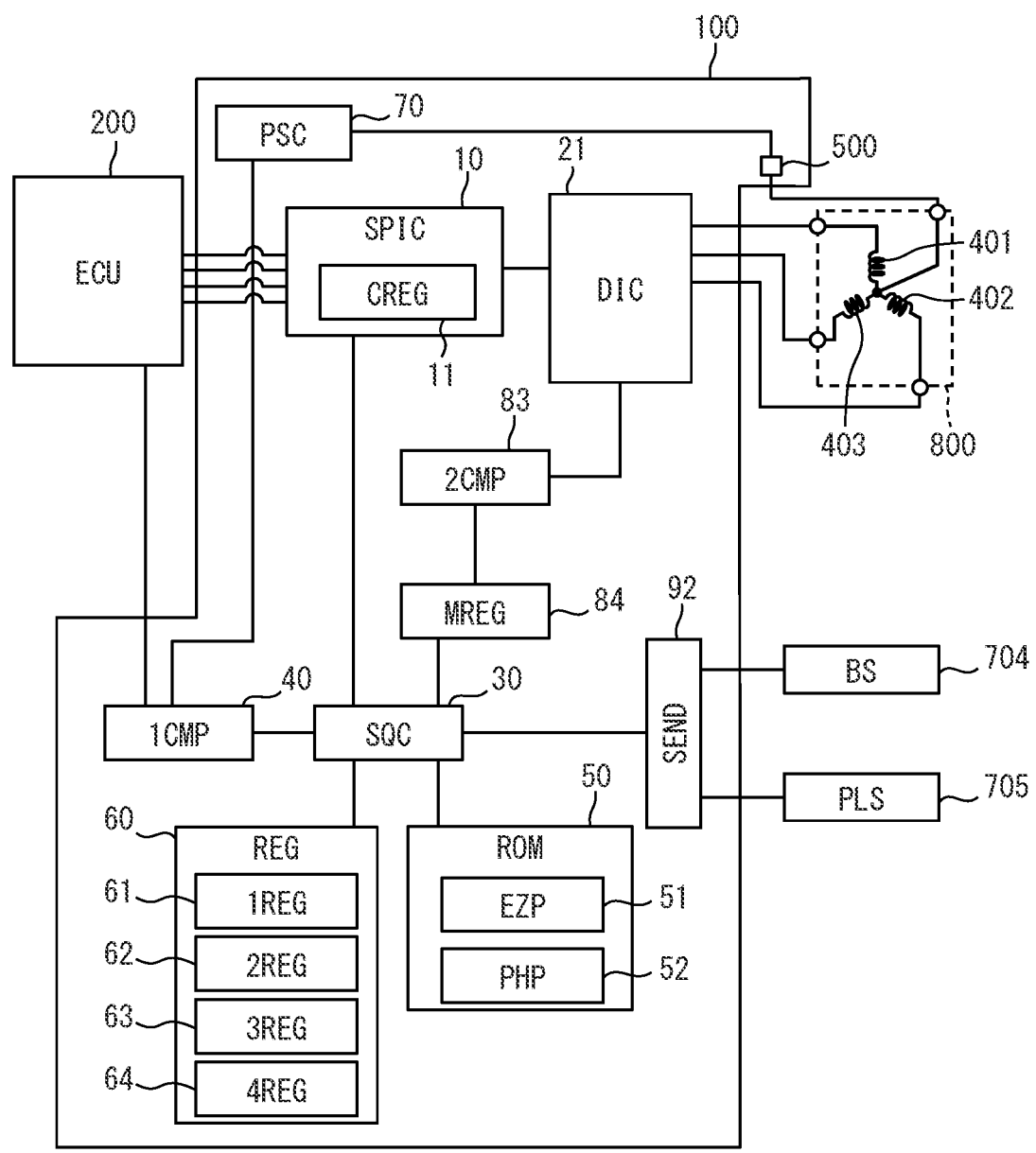
FIG. 23 is a circuit diagram illustrating a schematic configuration of a drive device in a tenth embodiment.

A drive device 100 of a tenth embodiment will be described with reference to FIG. 23. In the present embodiment, for convenience, the same reference numerals as in the first embodiment are used.

The tenth embodiment is different from the above-described embodiments in that the drive device 100 controls driving of a motor 800 in a shift-by-wire system. Therefore, the actuators 401 to 403 respectively correspond to a U-phase winding, a V-phase winding, and a W-phase winding of the motor 800. The power feed switch 500 of the present embodiment may employ a mechanical relay instead of a semiconductor switch.

The drive device 100 of the present embodiment is different from the drive device 100 of the first embodiment in that a sensor detection circuit 92 is provided. The present embodiment is different from the first embodiment in that each detection result from the sensor detection circuit 92 is used as the current driving state instead of the previous value of the control pattern. The present embodiment is different from the first embodiment in that a transition determination value is a value correlated with driving transition from the current driving state and a vehicle state.

The present embodiment is different from the first embodiment in that a signal indicating a driving state of each of the actuators 401 to 403 in a load control signal is written into a bit of a corresponding address in the control register 11. In the present embodiment, the updated value of the control pattern is employed as a correlated driving state of each of the actuators 401 to 403 correlated with the updated value of the control pattern stored in the control register 11.

In addition to the motor 800, the shift-by-wire system includes a parking lock (P lock) mechanism, a shift range switching mechanism, and the like. The motor 800 is rotated when electric power is supplied from a battery mounted on a vehicle (not illustrated), and functions as a driving source of the shift range switching mechanism. The motor 800 may supply a current to each actuator 40n by turning on the power feed switch 500. When the power feed switch 500 is turned off, the supply of current to each of the actuators 40n is blocked.

The updated value of the control pattern may employ, for example, a value indicating release of the P lock. That is, the ECU 200 causes a load control signal for the drive device 100 to include not only a signal indicating rotation of the motor 800 but also a signal indicating release of the P lock as.

The sensor of the present embodiment includes a brake switch 704 and a P-lock sensor 705. The brake switch 704 (BS) outputs a signal indicating whether a brake pedal is depressed. The brake switch 704 may output a signal corresponding to an amount of depression of the brake pedal. The P-lock sensor 705 (PLS) outputs a signal indicating whether the P lock is in a locked state or an unlocked state.

The sensor detection circuit 92 (SEND) detects a signal from the sensor 700. The sensor detection circuit 92 performs predetermined processing such as waveform detection and A/D conversion on an input signal from the sensor 700. The sensor detection circuit 92 detects a state of the load, that is, a state of the shift-by-wire system. That is, the state of the shift-by-wire system is regarded to be the current driving state indicating a driving state of each actuator 40n at present. Similarly, a detection result from the sensor detection circuit 92 is regarded to be the current driving state. The sensor detection circuit 92 detects a depressed state of the brake pedal of the vehicle. The depressed state of the brake pedal of the vehicle is regarded to be a vehicle state. The sensor detection circuit 92 corresponds to an acquisition unit.

Each detection result from the sensor detection circuit 92 may be represented by, for example, 0 and 1. The sensor detection circuit 92 outputs each detection result to the sequence circuit 30. The sensor detection circuit 92 may write each detection result into the monitor register 84.

The ROM 50 stores the detection results from the sensor detection circuit 92 and the transition prohibition pattern 52 in association with each other. That is, the transition prohibition pattern 52 is associated with the current driving state and a vehicle state. Instead of the transition prohibition pattern 52, a transition permission pattern may be stored in the ROM 50 in association with each detection result. Here, as an example, the transition prohibition pattern 52 is employed.

The sequence circuit 30 determines the current driving state and a vehicle state based on each detection result. The sequence circuit 30 sets the transition prohibition pattern 52 associated with each detection result in the fourth data register 64. The transition prohibition pattern 52 may employ, for example, an updated value of a control pattern indicating release of the P lock in a state in which the P lock is locked and the brake pedal is not depressed.

The first comparator 40 compares the updated value of the control pattern with the transition prohibition pattern 52 in the same manner as in the above embodiments. The first comparator 40 determines that the updated value of the control pattern is abnormal when the updated value of the control pattern matches the transition prohibition pattern 52, and determines that the updated value of the control pattern is normal when the updated value does not match the transition prohibition pattern 52.

The drive device 100 of the eighth embodiment is capable of achieving the same effect as that of the drive device 100 of the first embodiment.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10a. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A drive device that drives a plurality of loads by controlling a plurality of semiconductor switches corresponding to the loads, the drive device comprising:
   a control storage unit that stores a current value of a control signal including a signal indicating a drive state of each of the loads;

a drive unit that controls the plurality of semiconductor switches according to the current value of the control signal;

an acquisition unit that acquires a current drive state indicating the drive state of each of the loads at a present time;

a determination storage unit that stores a transition determination value for determining whether the current value of the control signal stored in the control storage unit is abnormal, the transition determination value being correlated with a driving transition from the current drive state; and a determination unit that compares a correlated drive state of each of the loads correlated with the current value of the control signal stored in the control storage unit with the transition determination value, and determines that the current value of the control signal is abnormal when the correlated drive state and the transition determination value satisfy a predetermined corresponding relationship, wherein the drive unit outputs a drive signal corresponding to the control signal to the plurality of semiconductor switches and controls a vehicle;

the control storage unit stores a previous value of the control signal in addition to the current value of the control signal; and the drive unit controls the plurality of semiconductor switches according to the previous value when the determination unit determines that the current value of the control signal is abnormal.

2. A drive device that drives a plurality of loads by controlling a plurality of semiconductor switches corresponding to the loads, the drive device comprising:

a control storage unit that stores a current value of a control signal including a signal indicating a drive state of each of the loads;

a drive unit that controls the plurality of semiconductor switches according to the current value of the control signal;

an acquisition unit that acquires a current drive state indicating the drive state of each of the loads at a present time;

a determination storage unit that stores a transition determination value for determining whether the current value of the control signal stored in the control storage unit is abnormal, the transition determination value being correlated with a driving transition from the current drive state;

a determination unit that compares a correlated drive state of each of the loads correlated with the current value of the control signal stored in the control storage unit with the transition determination value, and determines that the current value of the control signal is abnormal when the correlated drive state and the transition determination value satisfy a predetermined corresponding relationship; and a power supply unit that switches a power supply state for the plurality of loads, wherein:

the power supply unit sets the power supply state to be a power feed state when the determination unit determines that the current value of the control signal is not abnormal, and sets the power supply state to be a cut-off state when the determination unit determines that the current value of the control signal is abnormal; and the drive unit outputs a drive signal corresponding to the control signal to the plurality of semiconductor switches and controls a vehicle.

3. The drive device according to claim 1, wherein:

the determination storage unit stores, as the transition determination value, a prohibition determination value indicating prohibition of the driving transition from the current drive state; and when the correlated drive state is included in the prohibition determination value, the determination unit determines that the predetermined corresponding relationship is satisfied, and the current value of the control signal is abnormal.

4. The drive device according to claim 1, wherein:

the determination storage unit stores, as the transition determination value, a permission determination value indicating permission of the driving transition from the current drive state; and when the correlated drive state is not included in the permission determination value, the determination unit determines that the predetermined corresponding relationship is satisfied, and the current value of the control signal is abnormal.

5. The drive device according to claim 1, wherein:

the determination unit compares the transition determination value with the current value of the control signal stored as the correlated drive state in the control storage unit.

6. The drive device according to claim 1, wherein:

the determination unit compares the transition determination value with the current drive state acquired by the acquisition unit as the correlated drive state.

7. The drive device according to claim 1, wherein:

the determination storage unit stores the current value of the control signal and the transition determination value in association with each other; and the determination unit acquires the transition determination value associated with the control signal from the determination storage unit.

8. The drive device according to claim 1, wherein:

the determination storage unit stores the current drive state and the transition determination value in association with each other; and the determination unit acquires the transition determination value associated with the current drive state acquired by the acquisition unit from the determination storage unit.

9. The drive device according to claim 1, wherein:

the drive device drives the plurality of loads mounted on the vehicle;

the acquisition unit acquires a current vehicle state of the vehicle in addition to the current drive state; and the determination storage unit stores, as the transition determination value, a value for determining whether the current value of the control signal stored in the control storage unit is abnormal, the value being correlated with driving transition from the current drive state and the current vehicle state.

10. The drive device according to claim 2, wherein:

the control storage unit stores a previous value of the control signal in addition to the current value of the control signal; and the drive unit controls the plurality of semiconductor switches according to the previous value when the determination unit determines that the current value of the control signal is abnormal.

11. The drive device according to claim 2, wherein:
the determination storage unit stores, as the transition determination value, a prohibition determination value indicating prohibition of the driving transition from the current drive state; and
when the correlated drive state is included in the prohibition determination value, the determination unit determines that the predetermined corresponding relationship is satisfied, and the current value of the control signal is abnormal.

12. The drive device according to claim 2, wherein:
the determination storage unit stores, as the transition determination value, a permission determination value indicating permission of the driving transition from the current drive state; and
when the correlated drive state is not included in the permission determination value, the determination unit determines that the predetermined corresponding relationship is satisfied, and the current value of the control signal is abnormal.

13. The drive device according to claim 2, wherein:
the determination unit compares the transition determination value with the current value of the control signal stored as the correlated drive state in the control storage unit.

14. The drive device according to claim 2, wherein:
the determination unit compares the transition determination value with the current drive state acquired by the acquisition unit as the correlated drive state.

15. The drive device according to claim 2, wherein:
the determination storage unit stores the current value of the control signal and the transition determination value in association with each other; and
the determination unit acquires the transition determination value associated with the control signal from the determination storage unit.

16. The drive device according to claim 2, wherein:
the determination storage unit stores the current drive state and the transition determination value in association with each other; and
the determination unit acquires the transition determination value associated with the current drive state acquired by the acquisition unit from the determination storage unit.

17. The drive device according to claim 2, wherein:
the drive device drives the plurality of loads mounted on the vehicle;
the acquisition unit acquires a current vehicle state of the vehicle in addition to the current drive state; and
the determination storage unit stores, as the transition determination value, a value for determining whether the current value of the control signal stored in the control storage unit is abnormal, the value being correlated with driving transition from the current drive state and the current vehicle state.

* * * * *